United States Patent
Torii

[19]

[11] Patent Number: 5,913,059
[45] Date of Patent: Jun. 15, 1999

[54] MULTI-PROCESSOR SYSTEM FOR INHERITING CONTENTS OF REGISTER FROM PARENT THREAD TO CHILD THREAD

[75] Inventor: Sunao Torii, Tokyo, Japan

[73] Assignee: NEC Corporation, Toyko, Japan

[21] Appl. No.: 08/900,643

[22] Filed: Jul. 25, 1997

[30] Foreign Application Priority Data

Aug. 30, 1996 [JP] Japan .................................. 8-249272

[51] Int. Cl.[6] .................................................. G06F 9/40
[52] U.S. Cl. ........................................ 395/674; 395/678
[58] Field of Search .............................. 395/800.01, 379, 395/392, 394, 393, 670, 674, 676, 678, 680, 706

[56] References Cited

U.S. PATENT DOCUMENTS

| | | | |
|---|---|---|---|
| 5,179,702 | 1/1993 | Spix | 395/650 |
| 5,261,097 | 11/1993 | Saxon | 395/676 |
| 5,353,418 | 10/1994 | Nikhil | 395/678 |
| 5,404,469 | 4/1995 | Chung | 395/706 |
| 5,710,923 | 1/1998 | Jennings | 395/680 |
| 5,742,791 | 4/1998 | Mahalingaiah | 395/473 |
| 5,742,822 | 4/1998 | Motomura | 395/672 |

FOREIGN PATENT DOCUMENTS 58-43778  9/1983  Japan .
8-171494  7/1996  Japan .

OTHER PUBLICATIONS

M.S. Lam, et al., "Limits of Control Flow on Parallelism", The 19th Int'l. Symposium on Computer Architecture, IEEE Computer Society Press, pp. 46–57, 1992.

G. Sohi, et al., "Multiscalar Processor", The 22nd Int'l. Symposium on Computer Architecture, IEEE Computer Society Press, pp. 414–425, 1995.

*Primary Examiner*—Eric Coleman
*Attorney, Agent, or Firm*—Foley & Lardner

[57] ABSTRACT

Each of a plurality of processors in a multi-processor system executes a thread. The processor includes an execution unit, a reorder buffer which temporally keeps the execution results by the execution unit, a register which stores the execution results kept in the reorder buffer in-order, and an instruction queue which issues an instruction to be executed by the execution queue to the execution queue, the instruction having gotten data necessary for the execution unit. After a thread generation instruction is issued from a parent thread in the processors, only data generated by an instruction prior to the thread generation instruction is inherited from the parent thread to a child thread.

14 Claims, 31 Drawing Sheets

| BIT | OWNER RIGHT | MEANING |
|---|---|---|
| 00 | X | THIS PROCESSOR IS NOT RESERVING THIS PHYSICAL REGISTER |
| 01 | O | THIS PROCESSOR RESERVED THIS PHYSICAL REGISTER AFTER FORK |
| 10 | X | THIS PROCESSOR MADE THIS PHSYCAL REGISTER WITHOUT OWNER RIGHT |
| 11 | O | THIS PROCESSOR RESERVED THIS PHYSICAL REGISTER BEFORE FORK |

| AT THE TIME OF REGISTER RESERVING | PARENT, CHILD AND GRANDCHILD THREAD BEFORE STATE TRANSITION | AT THE TIME OF REGISTER RELEASE | PARENT, CHILD AND GRANDCHILD THREAD AFTER STATE TRANSITION | COMMENT |
|---|---|---|---|---|
| BEFORE FORK | 00 11 00 | BEFORE FORK | 00 00 00 | PERFECT RELEASE OF REGISTER |
| AFTER FORK | 00 01 00 | AFTER FORK | 00 00 00 | PERFECT RELEASE OF REGISTER |
| BEFORE FORK | 00 11 00 | AFTER FORK | 00 00 00 | ASSIGNMENT OF OWNER RIGHT TO GRANDCHILD THREAD |
| BEFORE FORK | 00 11 10 | AFTER FORK AFTER GRANDCHILD THREAD RELEASE | 00 00 11 | PERFECT RELEASE OF REGISTER |
| PARENT THREAD RESERVATION | 11 00 00 | BEFORE FORK | 00 00 10 | PRIOR RELEASE OF CHILD THREAD |
| PARENT THREAD RESERVATION | 11 00 00 | AFTER FORK BEFORE GRANDCHILD THREAD RELEASE | 11 10 00 | PRIOR RELEASE OF CHILD THREAD/GRANDCHILD THREAD DOUBLE OWNER RIGHT |
| PARENT THREAD RESERVATION | 11 00 10 | AFTER FORK AFTER GRANDCHILD THREAD RELEASE | 00 00 10 | PERFECT RELEASE OF REGISTER |

MULTI-PROCESSOR SYSTEM FOR INHERITING CONTENTS OF REGISTER FROM PARENT THREAD TO CHILD THREAD

BACKGROUND OF THE INVENTION

The present invention relates to a high-performance multi-processor system which executes a plurality of instructions simultaneously, more particularly to a multi-thread execution method for the multi-processor system.

A technique, to achieve a high-speed operation of processors, has been put to practical use, in which instructions are simultaneously issued to a plurality of arithmetic units installed therein, utilizing a parallelism of instruction unit, in order to increase a processing speed. With this technique, it will be ideally possible to execute a plurality of instructions every clock cycle.

However, there are dependencies between the instructions. If antecedent instruction is not completed, subsequent instructions sometimes can not be executed. Therefore, the number of the instructions to be simultaneously executed is limited. Moreover, phenomenon that instructions are not smoothly supplied to the arithmetic unit may occur, due to a conditional branch instruction. From such circumferences, if there are infinite number of the arithmetic units, an increase in performance of the system is actually suppressed to only three or four times.

Such kind of the limitation in the increase in the performance of the system is described (Monica Lam and Robert Willson: "Limits of Control Flow on Parallelism", The 19th International Symposium on Computer Architecture, IEEE Computer Society Press, pp.46–57, 1992).

Taking account of this limitation, as means for further increasing the performance of the system, the following technologies have been proposed.

(1) In order to further exploit parallelism for the instruction unit, an out-of-order execution mechanism and a register renaming mechanism are introduced thereby lessening the dependence relationship between the instructions.

(2) A program is divided into a plurality of threads, and the parallel processing is executed in accordance with the level of the threads.

The out-of-order execution mechanism in the item (1) is one that executes the instruction first which becomes capable of being executed, regardless of the execution order of the program. To achieve this, it is necessary to resolve anti-dependencies introduced by lack of the registers at the time of allocation of the registers even if data dependencies have been resolved. For solving the anti-dependencies, a register renaming mechanism dynamically changes the name of the register designated by software to another name.

For example, it is assumed that the instructions are issued according to the following program, 0x10: add r1←r2+r3
0x14: sub r4←r1−r5
0x14: add r5←r6+r7
0x1c: sub r8←r4−r5

Here, since the sub instruction of the address "0x14" uses the result of add instruction (r1 register) of address "0x10", the data dependence will exist for a register "r1". Similarly, the sub instruction of address "0x1c" has the dependence with the add instruction of the address "0x18". Although there are no data dependence between the sub instruction of the address "0x14" and the add instruction of the address "0x18", there exists an anti-dependence for a register "r5". Therefore, the add instruction of the address "0x18" cannot be executed before the completion of the sub instruction of the address "0x14". In such case, the register renaming mechanism renames the register "r5" of the address "0x14" and the register "r5" of the address "0x18" with other names, whereby the register renaming mechanism makes the out-of-order execution possible.

However, even if such register renaming mechanism is used, there are only 16 through 32 instructions at most for the out-of-order execution. There often happens the case where a large number of the instructions for which the out-of-order execution can be performed are not present. Moreover, when this range is increased to the actual extent, there are many instructions which can not be executed due to the foregoing dependence. Therefore, an increase in performance matching with an increase in the quantity of the hardware cannot be expected.

On the other hand, the parallel processing system with the level of the thread is the method in which instructions are not executed unit by unit but instructions by a plurality of thread are in parallel executed whereby the arithmetic unit is utilized more effectively, resulting in an increase in processing speed. According to this method, in general, little dependence is present between the threads, so that an increase in performance can be easily achieved than in the case of the parallel processing with the foregoing instruction level.

At the time when a processing speed for the single task is increased in a parallel processing at the thread level, generation of the threads with a high efficiency and data delivery between the threads are essential. As an example of parallel processing processors for fine threads, the paper is mentioned (Gurinder Sohi, Scott Breach and T. Vijaykumar: "Multiscalar Processor", The 22nd International Symposium on Computer Architecture, IEEE Computer Society Press, pp.414–425, 1995).

In the Multiscalar Processor, a single program is divided into "tasks", each of which is an aggregation of basic blocks, and the "tasks" are processed by a processor capable of performing parallel execution. The delivery of the register contents between the tasks is designated by a task descriptor which is generated by a task generation compiler. The task descriptor explicitly designates the register which is to be generated. This designation is called a create mask. Moreover, forward bits are added to the instruction for updating the register which is finally designated to the create mask. As described above, the Multiscalar Processor performs the parallel execution according to codes depending on compiler analysis ability.

However, in case of conversion of the conventional code to thread level parallel processing or in case of codes which are difficult to be subjected to dependency analysis, the Multiscalar Processor has no ability to enhance its performance. Moreover, the problem of an increase in a code size by the task descriptor is produced. Since the Multiscalar Processor does not correspond to the out-of-order execution, the Multiscalar Processor cannot enhance the performance by virtue of the existing instruction level parallel processing so that an enhancement in the performance is limited compared to the conventional technology.

As described above, in the conventional thread generation technology for the thread level parallel processing, the contents of the registers are inherited explicitly or through the memory. Therefore, it is required to describe register dependency or to inherit data to newly generated threads using load/store instructions. Therefore, for generation of threads, instructions for data inheritance must be inserted into both thread-generating threads and generated threads.

Moreover, the out-of-order execution type processor performs an in-order execution for synchronous instructions in order to keep the validity. In this case, a decrease in performance is remarkable. Therefore, the threads are generated according to "fork" instructions. In case of fine threads, when an increase in the processing speed is intended, it is required to perform the out-of-order execution for instructions before and after issuing of the fork instruction.

SUMMARY OF THE INVENTION

In view of the foregoing problem of the conventional system, an object of the present invention is to provide a multi-thread execution method which effectively transfers contents of a register to newly generated threads to increase both of parallelism of programs and a utilization ratio of an arithmetic unit and is capable of performing parallel processing for fine threads with a high performance.

In a preferred embodiment of the present invention, a multi-processor system of the present invention has a plurality of processors. Each of the processors includes a register. When a thread generation instruction is issued from a first processor to a second processor, contents of the register of the first processor is inherited to that of the second processor.

BRIEF DESCRIPTION OF THE DRAWINGS

The above-mentioned and other objects, features and advantages of this invention will become more apparent by reference to the following detailed description of the invention taken in conjunction with the accompanying drawings in which:

FIG. 29 is a view showing extended two bits of a stable table 117 in the twelfth embodiment of the present invention;

FIG. 30 is a view showing logic of register opening when instruction program order is completed in child threads in the twelfth embodiment of the present invention.

DETAILED DESCRIPTION OF THE PREFERRED EMBODIMENTS

A multi-processor system in accordance with preferred embodiments of the present invention will be described in detail with reference to the accompanying drawings.

Figure 1:
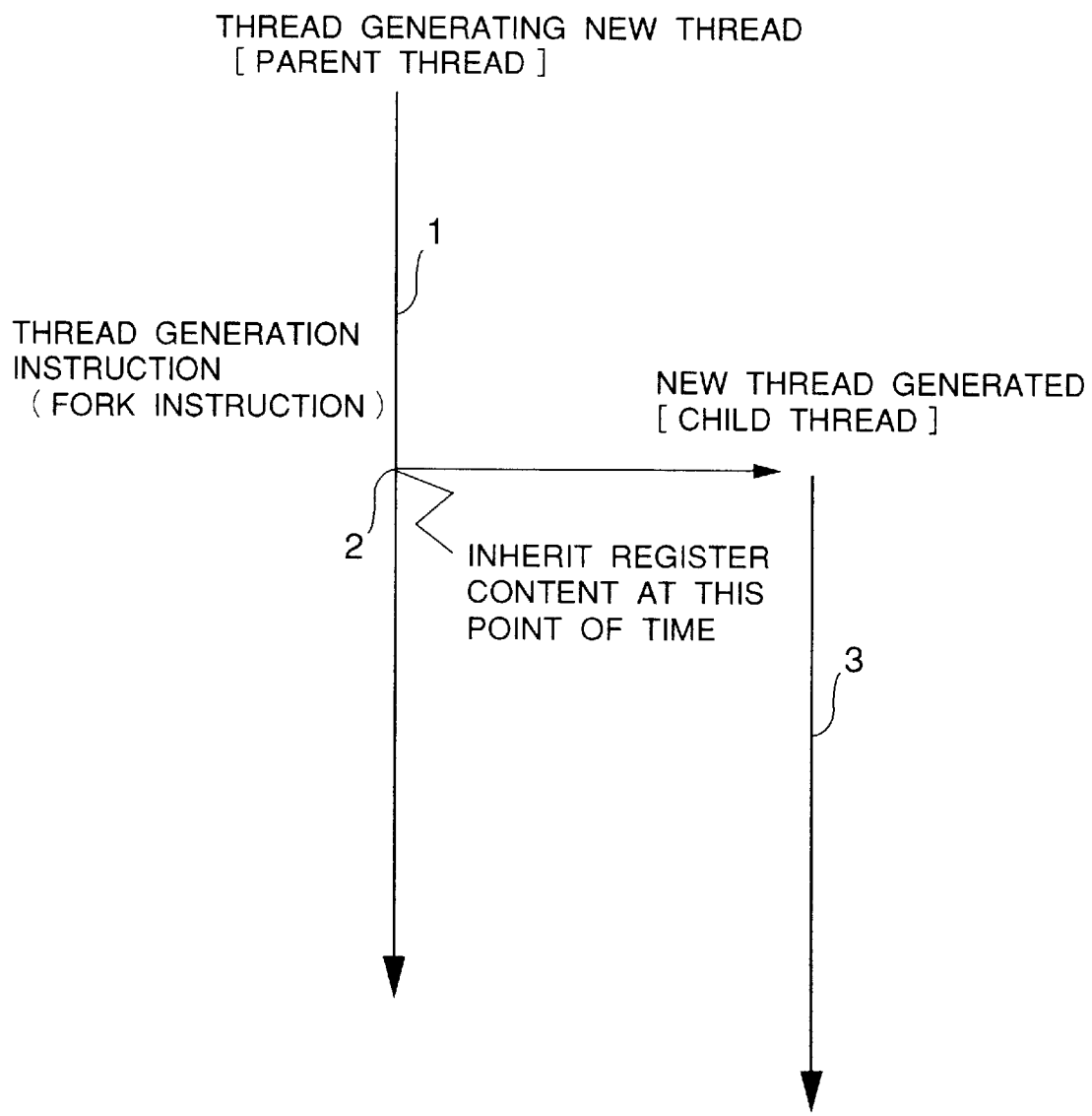
FIG. 1 is a schematic view of a method of inheriting contents of a register of a first embodiment of the present invention.

Referring to FIG. 1, a schematic view showing a method of inheriting contents of a register in a first embodiment of the present invention is illustrated. When a thread 1 (a parent thread) generating a new thread 3 (a child thread) executes a thread generation instruction 2 (a "fork" instruction) on a course of an execution flow to generate the new thread 3, the content at the time when the parent thread 1 executes the fork instruction 2 is inherited to a register file of the child thread 3.

Figure 2:
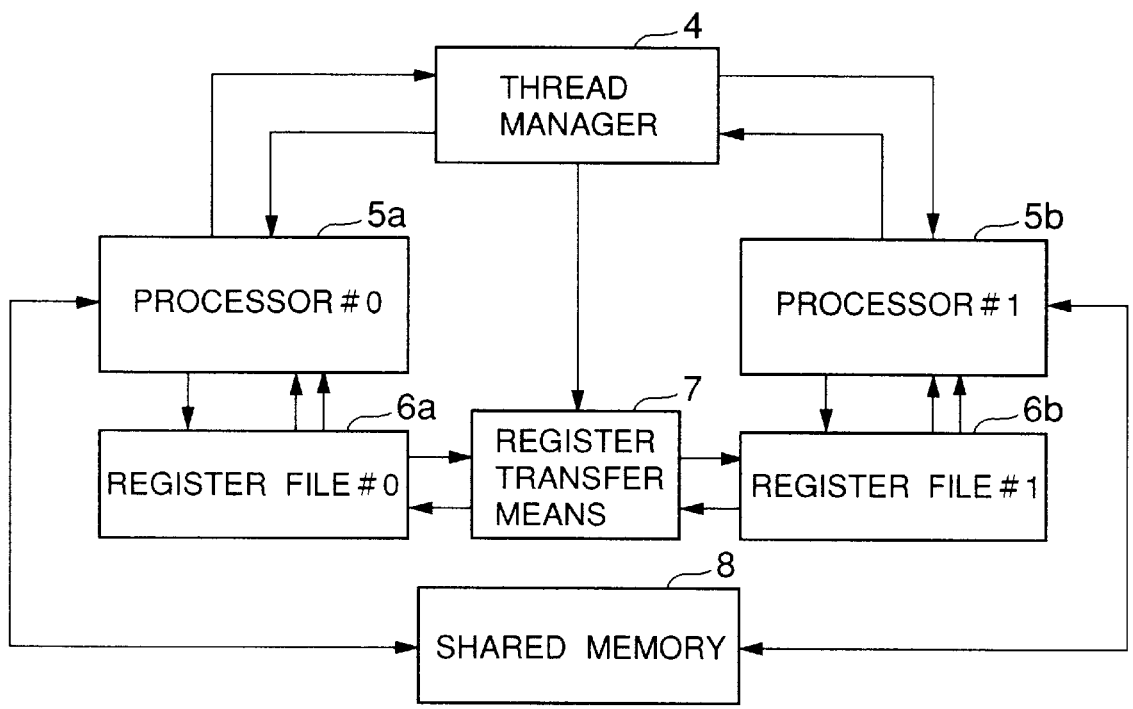
FIG. 2 is a block diagram of a processor of two-thread parallel execution type for realizing the method of inheriting the contents of the register of the first embodiment of the present invention.

Referring to FIG. 2, a two-thread parallel execution type processor which realizes the method of inheriting the foregoing register contents includes thread manager 4, processors 5a and 5b, register files 6a and 6b, register transfer means 7 and a shared memory 8.

The thread manager 4 performs an execution control for the threads of all the processors. The same number of a pair of the processor 5 and the register file 6 as that of the threads which can be subjected to simultaneous processing (see two pairs of the processors and register files 5a and 6a, and 5b and 6b in FIG. 2). The processor 5a and 5b executes instructions included in program codes like ordinary processors. The processor 5a and 5b perform their processing while performing writing of the results to the register files 6a and 6b and the shared memory 8.

The register transfer means 7 transfers the content of a register file where the thread is generated at the time of thread generation to another register file. The register content batch transfer means 7 is realized, for example, by buses.

Next, operations at time of thread generation in the first embodiment of the present invention will be described following the sequence of time.

Figure 3:
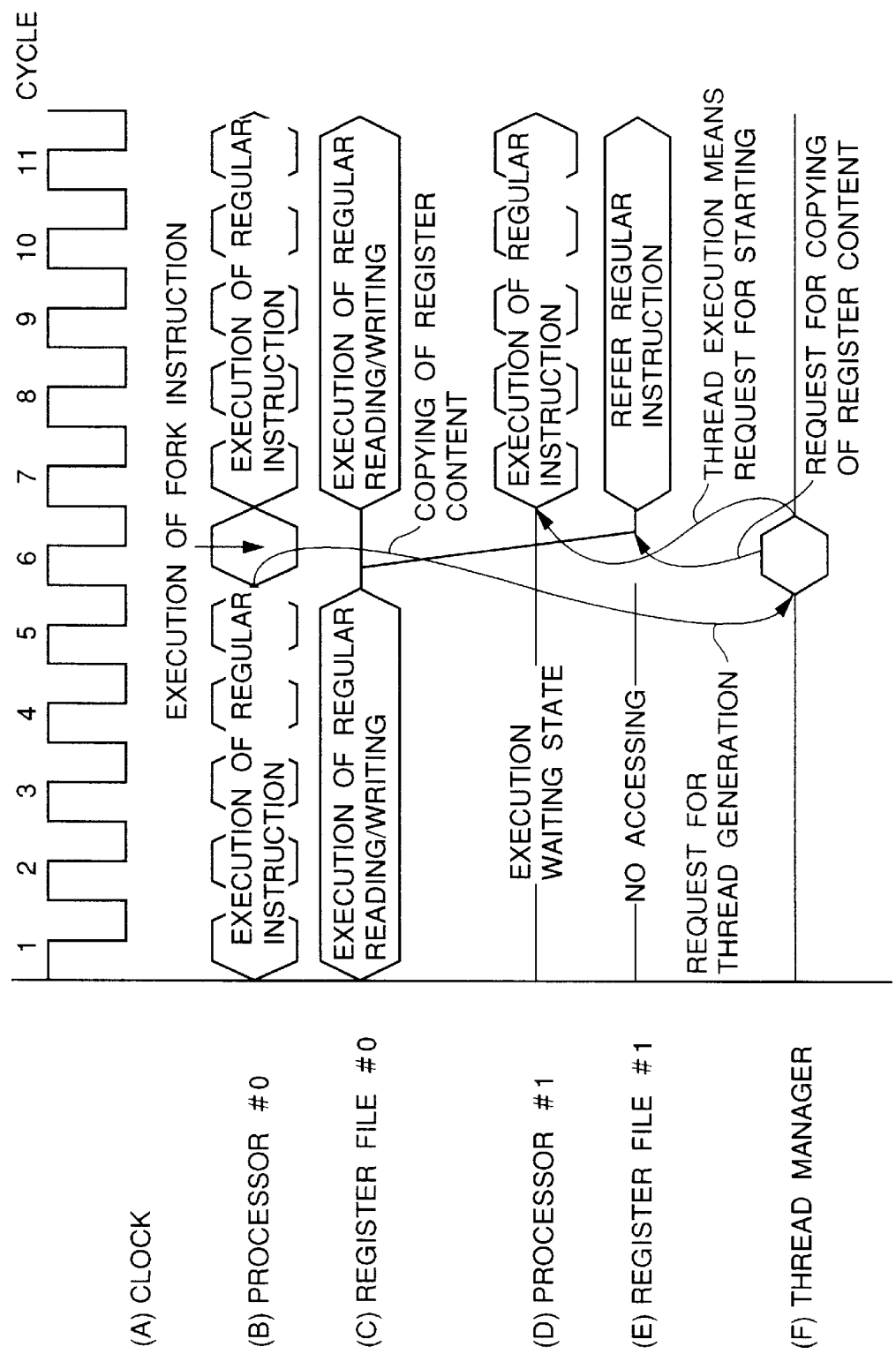
FIG. 3 is a timing chart at the time when threads are generated in the first embodiment of the present invention.

In the timing chart example at the time of thread generation in FIG. 3, reference symbol (A) denotes clocks of the whole of the processor; (B), an execution state of the processor #0 (5a); (C), an access state of the register file #0 (6a); (D), an execution state of the processor #1 (5b); (E), an access state of the register file #1 (6b); and (F), an access state of the thread manager 4, respectively.

Referring to FIG. 3, at the time of beginning of the timing chart, processing is performed only in the processor #0 (5a). The processor #1 (5b) is in stand-by state for execution. Therefore, no access to the register file #1 (6b) occurs.

In cycle 6, the processor #0 (5a) executes the fork instruction, whereby performs a thread generation request for the thread manager 4. The thread manager 4 retrieves the processor which is in stand-by state for execution, and determines a processor which should execute a new thread. In case of this example, since the processor #1 (5b) denoted by the symbol (D) is in stand-by state for execution, the thread manager 4 determines that the processor #1 (5b) should execute the new thread. Thus, the thread manager 4 requests starting of thread execution for the processor #1 (5b). At the same time, the thread manager 4 issues, to the register transfer means 7, a request of copying of the register content from the register file #0 (6a) to the register file #1 (6b). The register transfer means 7 performs copying of the register content from the register file #0 (6a) to the register file #1 (6a) according to this request. By these operations, in cycle 7, two threads are executed in parallel.

As described above, according to the first embodiment of the present invention, when the content of the register file is inherited at the time of fork, all of the contents of the register file at the time of fork are physically inherited to the register file in the processor which executes a newly generated thread. Therefore, effective generation of the thread will be possible.

Next, a second embodiment of the present invention will be described.

Figure 4:
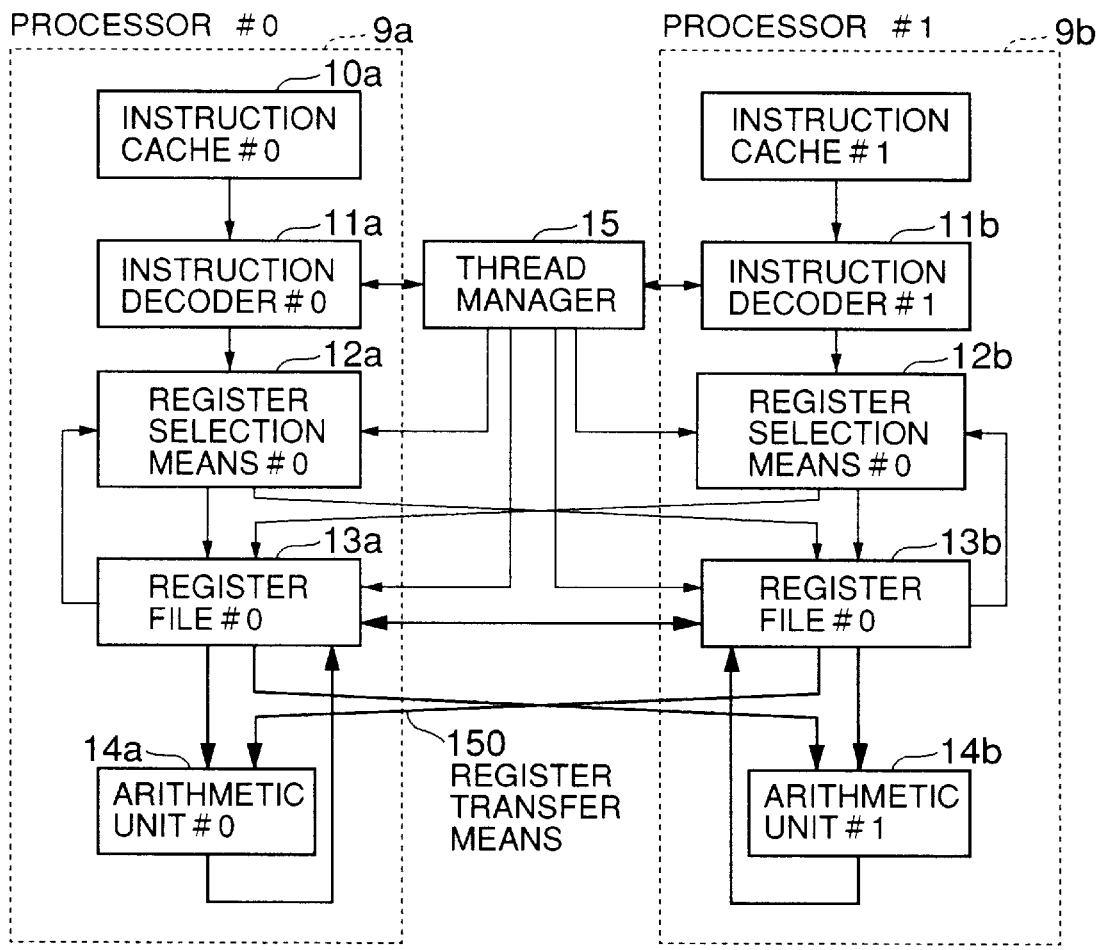
FIG. 4 is a block diagram of a processor of two-thread parallel execution type for realizing the method of inheriting the contents of the register of a second embodiment of the present invention.

Referring to FIG. 4, a two-thread parallel execution type processor of the second embodiment comprises processors 9a and 9b, each of which includes an instruction cache 10a or 10b, an instruction decoder 11a or 11b, register selection means 12a or 12b, a register file 13a or 13b, and an arithmetic unit 14a or 14b. Moreover, a thread manager 15 and register transfer means 150 which are shared by the processors 9a and 9b exist between them.

In the processor 9a, the instruction decoder 11a decodes the instruction from the instruction cache 10a to extract the register number and the arithmetic unit required for execution and the register number for storing the execution result. The register selection means 12a stores information indicating which processor's register file should be referred corresponding to each register number.

By monitoring the execution state of each processor, the thread manager 15 selects for the generation request the processor which is in an empty state. The thread manager 15 also manages an inheritance relationship such as a thread generation order and a parent-child relationship.

Figure 5:
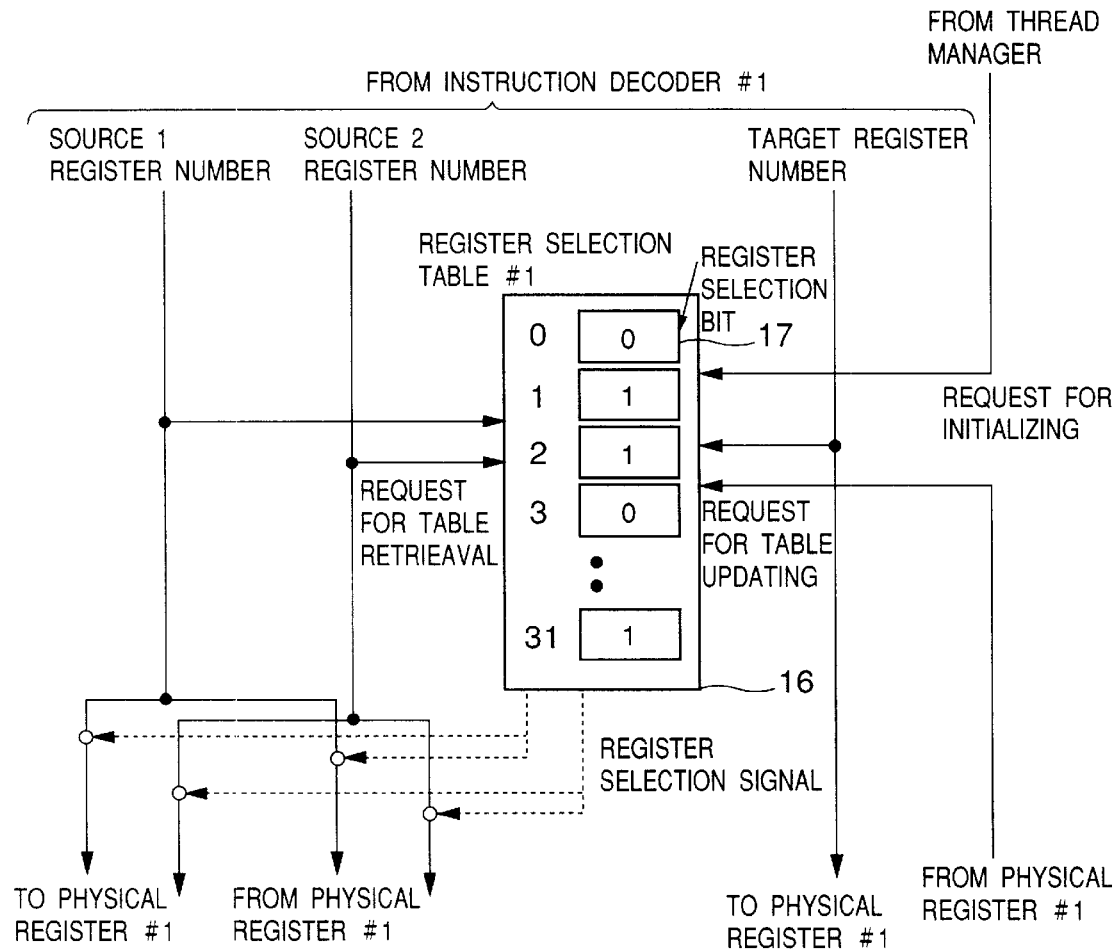
FIG. 5 is a block diagram showing a configuration of a register selection means #1 (12b) in the second embodiment of the present invention.

Referring to FIG. 5, the register selection means #1 (12b) includes a register selection table 16. The register selection table 16 includes a register selection bit 17 for every register. The register selection bit 17 indicates which processor's register file should be referred at the time when corresponding register is referred. In a case of this embodiment, when the register selection bit 17 is "0", the register file #0 (13a) is selected. When the register selection bit 17 is "1", the register file #1 (13b) is selected. The register selection means #0 (12a) also has the same configuration as the register selection means #1 (12b).

Figure 6:
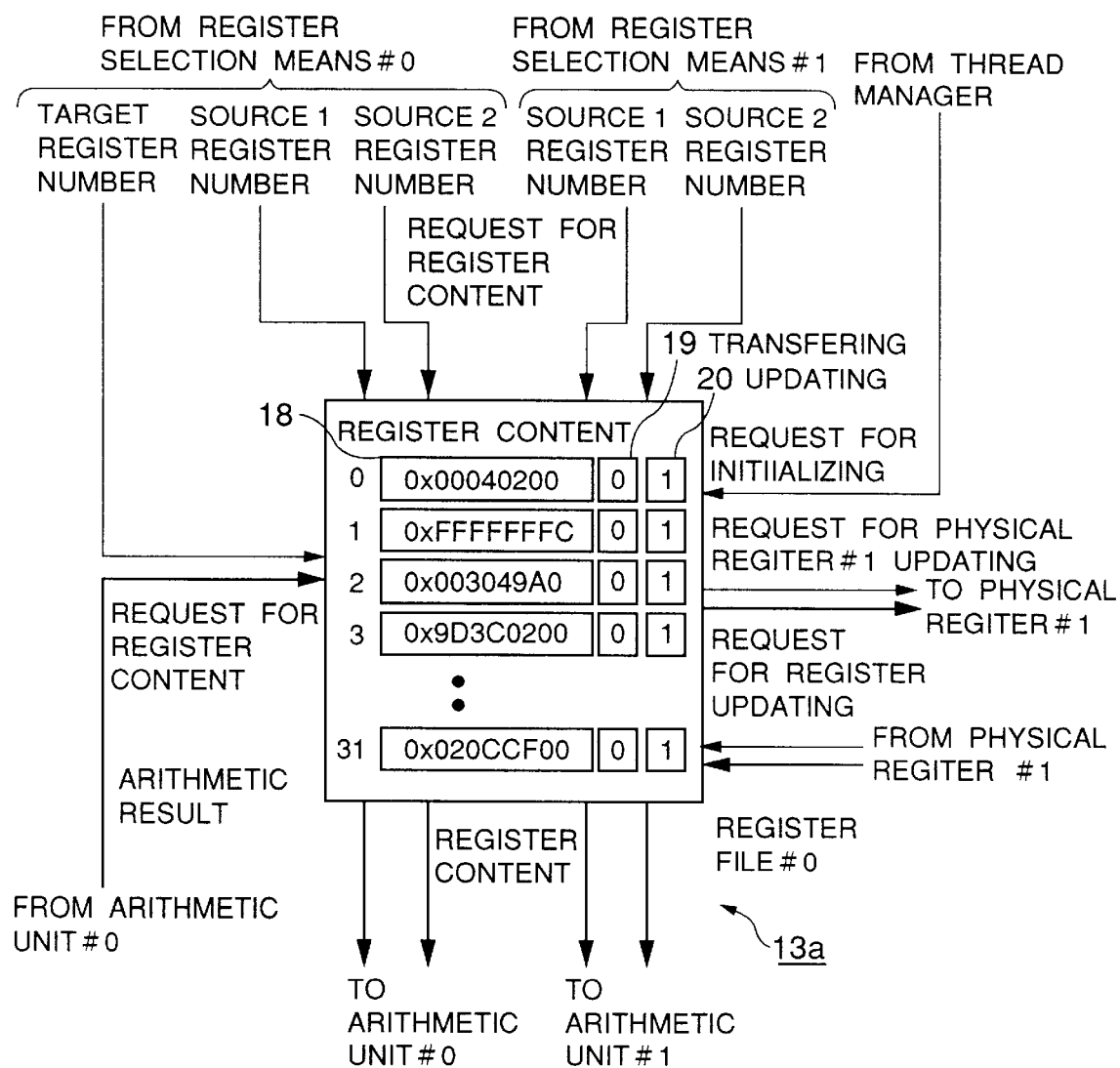
FIG. 6 is a block diagram showing a configuration of the register file #0 (13a) in the second embodiment of the present invention.

Referring to FIG. 6, the register file #0 (13a) keeps a register content memory 18, a transfer completion bit 19, and an update bit 20 for every register. The register content memory 18 stores the data value of the register file therein. The transfer completion bit 19 shows whether the register actually transfers the thread to another thread, which logically is assumed to transfer the thread to another. When data is updated after the fork for the register to which the transfer completion bit 19 is not set, the register content must be sent to another register prior to the update. Otherwise, the register value of the child thread is destroyed. This transfer completion bit 19 is reset at the time of the generation of the child thread by the thread manager 15, and is set when the value of the register content memory 18 is inherited to another register file 13.

On the other hand, the update bit 20 shows that after starting of the thread the register is updated by this thread. When the update bit 20 is set, the data inherited from the parent thread is neglected, that is, this data is not used for updating. This update bit 20 is reset at the time of starting of thread, and is set at the time of updating by the arithmetic unit 14a. The register file #1 (13b) has also the same constitution as the register file #0 (13a).

Next, a method of inheriting the register content at the time of the thread generation of the second embodiment of the present invention.

Figure 7:
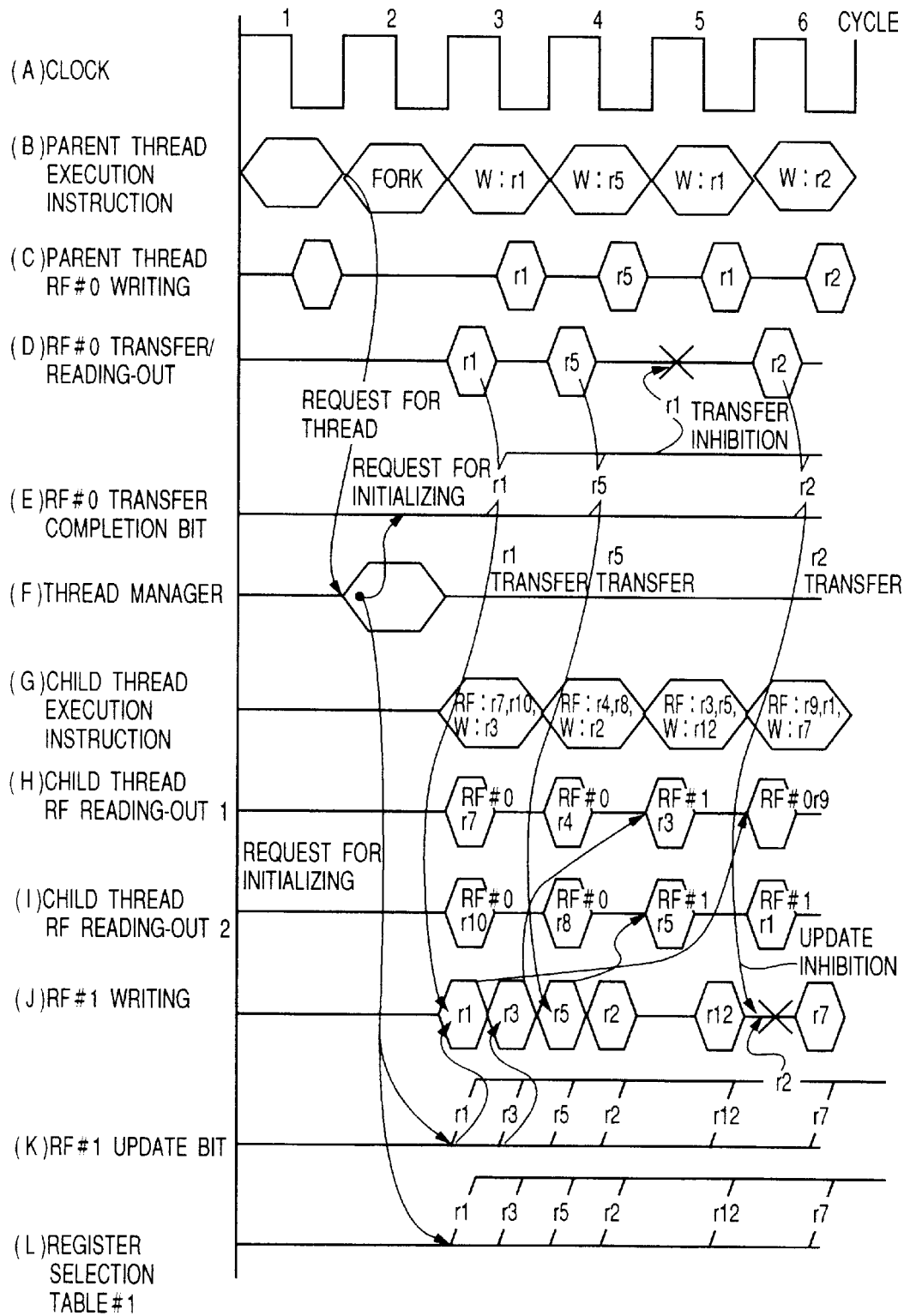
FIG. 7 is an example of a timing chart in the second embodiment of the present invention.

Referring FIG. 7, in a timing chart example shown in FIG. 7, reference symbol (A) denotes clocks of the whole of the processors; (B), an instruction which is being in the arithmetic unit #0 (14a) or the register number written; (C), writing of the register content for the register,file #0 (13a) by the parent thread; (D), reading-out of the register content for the register content #0 (13a) by inheriting the register content; (E), a state of the transfer completion bit 19 in the register file #0 (13a); (F), an access state of the thread manage 15; (G), an instruction which is being executed by the arithmetic unit #1 (14b) (the child thread) or the register number which is read out/written; (H) and (I), reading out of the register file 13 by the child thread; (J), writing to the register file #1 (13b); (K), a state of the update bit in the register file #1 (13b); and (L), a state of the register selection bit 17 in the register selection means #1 (12b).

At the time of starting of the timing chart shown in FIG. 7, the thread is executed by only the processor #0 (9a). This thread is called a parent thread.

In cycle 2, the parent thread executes a fork instruction. The thread manager 15 issues a request for initializing (resetting) the transfer completion bit 19 of the register file #0 (13a), the update bit 20 of the register file #1 (13b), and the register selection bit 17 in the register selection means #1 (12b). By executing the fork instruction, in the cycles subsequent to the cycle 3, the execution for the child thread according to the fork instruction in the cycle 2 is begun by the processor #1 (9b).

In the cycle 3, before the writing to the register r1 is performed in the processor #0 (9a) which is executing the parent thread, reading is performed to transfer the content of the register r1 to the processor #1 (9a) (see (D) in the first half of the cycle 3). The content of the register r1 is transferred to the register file #1 (13b) of the processor #1 (9b), and is written thereto (see (J) of the first half of the cycle 3). At the same time, an entry of the transfer completion bit 19 of the register file #0 (13a) and the update bit 20 of the register file #1 (13b) to the register r1 is set, the register selection bit 17 in the register selection means #1 (12b) are set so as to be selected from the register r1 or the register file #1 (13b).

Moreover, also in the cycle 3, the processor which is executing the child thread reads out the register r7 or r10. In this reading-out, the register r7 or r10 is read out from the register file #0 (13a) depending on the contents of the register selection means #1 (12b). In addition, the child thread in the cycle 3 performs writing to the register r3, and, at this time, the register r3 of the register selection bit 17 in the register selection means #1 (12b) is set to be selected from the register file #1 (13b). At the same time, an entry to the register r3 of the update 20 of the register file #1 (13b) is set. Thus, the transfer of the register r3 from the register file #0 (13a) to the register file #1 (13b) will be unnecessary.

In the cycle 4, the same processing is performed. The content of the register r5 is transferred. The transfer completion bit 19 of the register file #0 (13a), the update bit 20 of the register file #1 (13b), an entry of the register r5 of the resister selection bit 17 in the register selection means #1 (12b) are set. Moreover, in the cycle 4, the register selection bit 17 in the register selection means #1 (12b) and an entry of the update bit 20 of the register file #1 (13b) are set.

In the cycle 5, in the processor #0 (9a) which is executing the parent thread, an instruction to perform writing again for the register r1 is executed. However, since the entry of the register r1 of the transfer completion bit 19 of the register file #0 (13a) has been already set, the transfer of the register content is not performed. Moreover, in the cycle 5, in the processor #1 (9b) which is executing the child thread, the registers r3 and r5 are read out so that they are referred. At the time of this reading-out, since the entry corresponding to the register selection means #1 (12b) is set, reading out is performed from the register file #1 (13b).

In the cycle 6, the processor #0 (9a) which is executing the parent thread executes the instruction of writing for the register r2, whereby the content of the register is inherited. However, since the entry of the register r2 of the update 20 of the register file #1 (13b) has been already set, the data according to the writing for the register r2 is not written to the register content memory 18 of the register file #1 (13b).

As described above, according to the second embodiment of the present invention, it is not necessary to perform collective transfer for all of the contents of the register file at the time of execution of the fork instruction to generate the threads. Therefore, while the wide of the transfer band between the register files is reduced, it will be possible to inherit the content of the register to the child thread.

Although the two-thread parallel execution type processor is described in this second embodiment, it is possible to cope with parallel processing for the three-threads or more if the destination to which the register is inherited is controlled by the thread managing unit, the register files are connected by buses or the like and an extension capable of multi-inheritance of the threads between the registers is provided.

Moreover, although in the register selection means, the register selection bits indicating which register file should be selected are stored in a plurality of bits, the register selection means is primarily used. The second embodiment is within the scope of the present invention.

Figure 8:
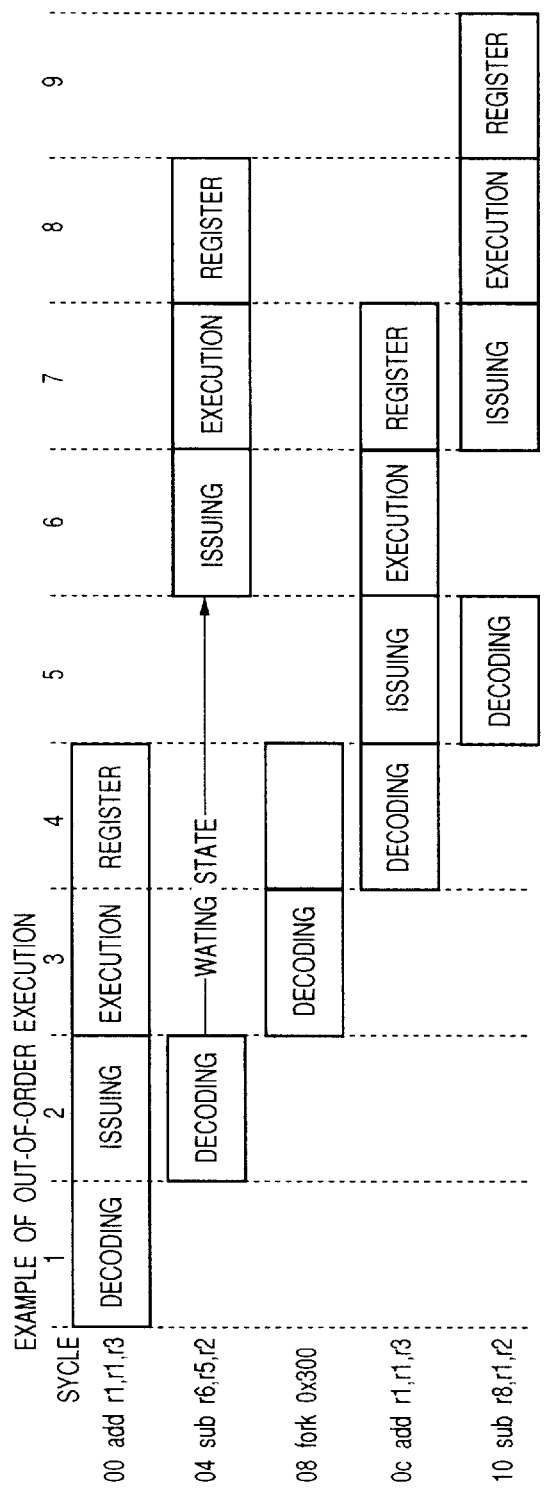
FIG. 8 is an operation explanatory view of a third embodiment of the present invention.

Next, a third embodiment of the present invention will be described. In the third embodiment, the program is sequentially executed semantically. Actual processing by hardware is not necessarily executed according to the 20 program order as shown in FIG. 8. For this reason, for example, in an ideal view of the execution shown in FIG. 8, the processing by the hardware is necessary, in which the register content by the execution of the instruction for the addresses "0x00" and "0x04" is inherited and the register content by the execution of the instruction for the addresses "0x0c" and "0x10" is not inherited.

Figure 9:
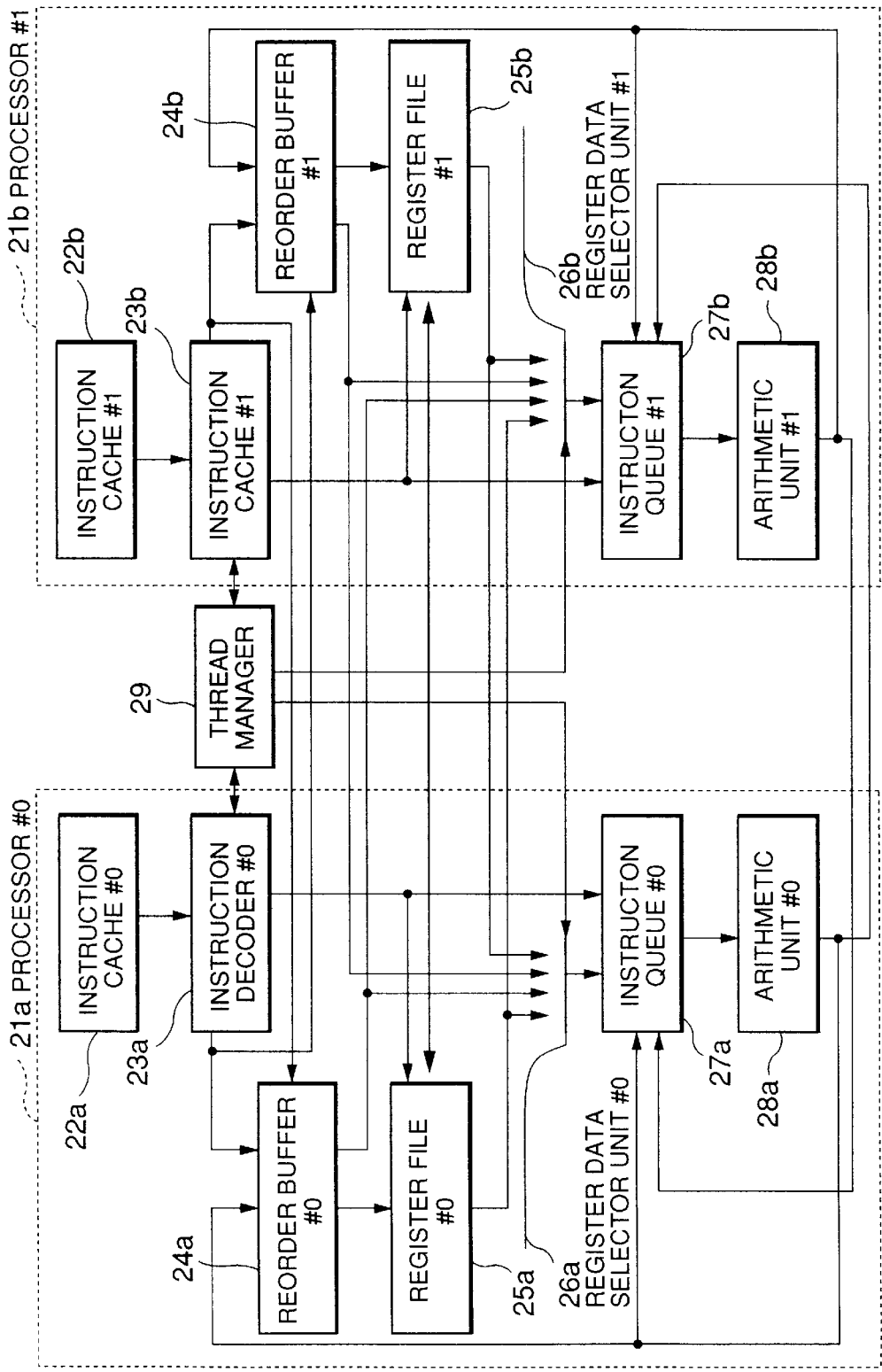
FIG. 9 is a block diagram of a processor of two-thread parallel execution type of the third embodiment of the present invention.

Referring to FIG. 9, the two-thread parallel execution type processor of the third embodiment comprises two processors #0 (21a) and #1 (21b), each of which includes an instruction cache 22a or 22b; an instruction decoder 23a or 23b; a reorder buffer 24a or 24b; a register file 25a or 25b; a register data selector unit 26a or 26b; an instruction queue 27a or 27b; and an arithmetic unit 28a or 28b, respectively. Moreover, a thread manager 29 shared by the instruction decoders 23a and 23b is arranged therebetween.

The reorder buffer 24 stores the arithmetic result for the instruction for a period of time until it is determined whether the instruction is executed or not. In the reorder buffer 24, the entry is reserved at the instruction decoding. The arithmetic result is written to the entry as soon as the arithmetic result is generated. Specifically, there is a possibility that an out-of-order writing may be performed to the reorder buffer 24. On the other hand, a writing from the reorder buffer 24 to the register file 25 is performed in accordance with the program order (in-order). A tag number is attached to each entry of the reorder buffers 24.

The instruction queue 27 stores a decoded instruction by the instruction decoder 23. The instruction queue 27 waits the necessary data for the decoded instruction. An instruction is issued from the instruction queue 27 to the arithmetic unit 28 in the order of the instructions to which the necessary data to execute the instruction is given prior to others. The data stored in the instruction queue 27 is supplied from the reorder buffer and the register file. The register selector 26 selects the suitable value among these.

Figure 10:
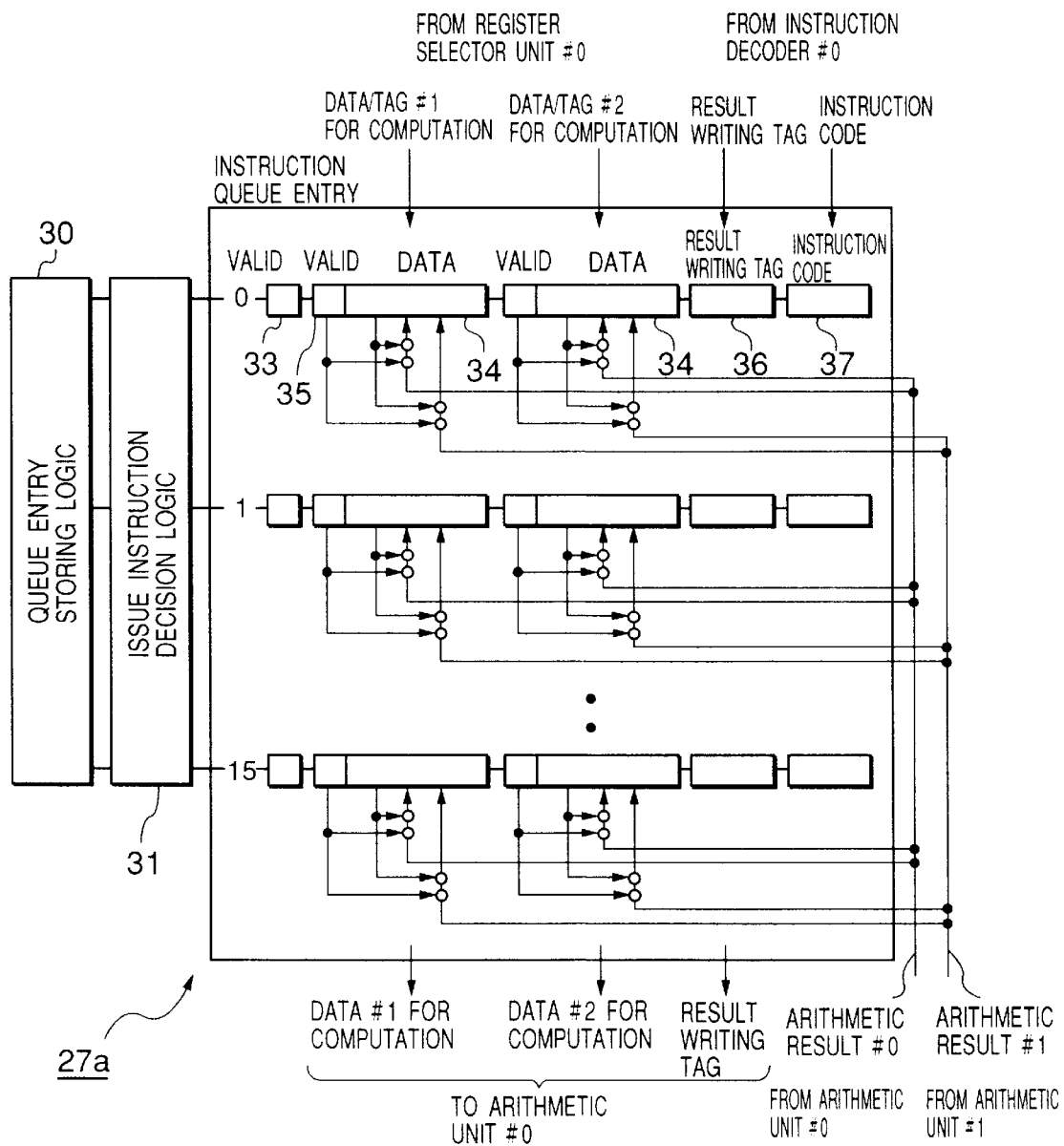
FIG. 10 is a block diagram showing a configuration of an instruction queue #0 (27a) in the third embodiment of the present invention.

Referring to FIG. 10, the instruction queue #0 (27a) is a mechanism which waits until the value of the necessary register is decided for the decoded instruction and computation for this can be performed. The instruction queue #0 (27a) includes a queue entry storing logic 30, an issue instruction decision logic 31, and an instruction queue entry 32. The instruction queue #1 (27b) has also the similar configuration to that of the instruction queue #0 (27a).

The instruction queue entry 32 stores necessary information for issuing the instruction. The instruction queue entry 32 includes an entry for an entry effective bit 33, a register data memory 34, a register content effective memory 35, a result writing position designation tag 36, and an instruction storing memory 37.

The entry effective bit 33 shows whether data stored in the entry is effective or not.

The register data memory 34 stores the different values depending on the state of the register content effective bit 35. When the register content effective bit 35 is set, data necessary for computing the corresponding instruction is stored in the register data memory 34. When the register content effective bit 35 is not set, the tag number in the reorder buffer 24 is stored in the register data memory 34.

The result writing position designation tag 36 stores the tag number in the reorder buffer 24 which stores the result obtained by executing this instruction.

The instruction code storing memory 37 stores the code of instruction sort decoded by the instruction decoder 23. The queue entry storing logic 30 is a logic which stores date necessary for an empty entry, selects one of the ineffective entries of the entry effective bit 33, and stores the information from the register data selector unit 26 and the instruction decoder 23.

The issue instruction decision logic 31 decides the instruction to be issued among entries for which the register content effective bit 35 becomes effective, and issues the instruction to the arithmetic unit 28.

Moreover, the instruction queue entry 32 has same configuration as an associative memory. In the instruction queue entry 32, for the entry to which the register content effective bit 35 is not set, the tag number sent from the arithmetic unit 28 is compared with its tag number. When both tag number accord with each other, the arithmetic result for its tag number is stored in the register data memory 34, and, at the same time, the register content effective bit 35 is set.

Figure 11:
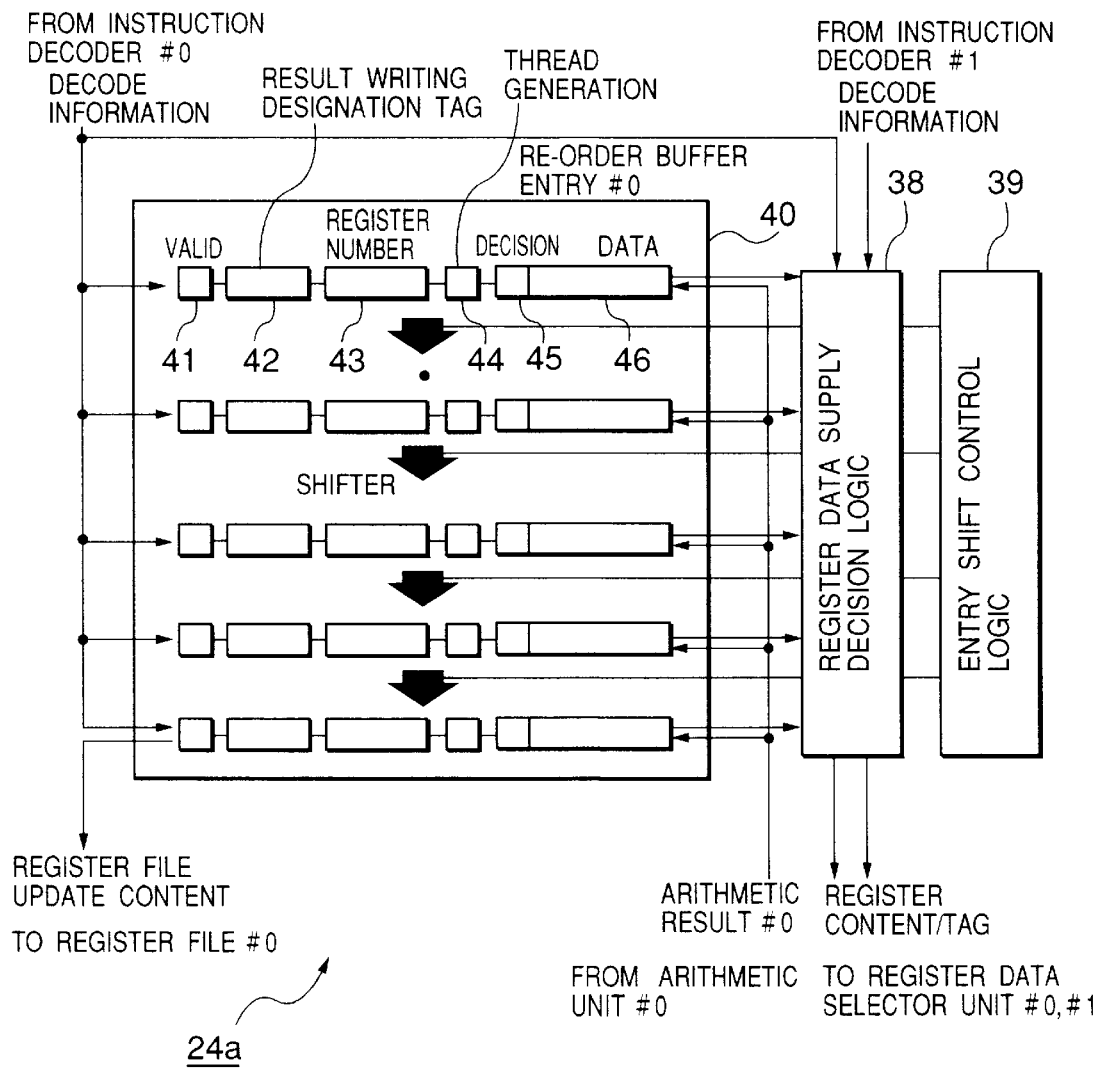
FIG. 11 is a block diagram showing a configuration example of a reorder buffer #0 (24a) in the third embodiment of the present invention.

Referring to FIG. 11, the reorder buffer #0 (24a) stores the register values generated by the out-of-order execution, and writes back the register values to the register file 25 according to the order of the program. The reorder buffer #0 (24a) includes a register data supply decision logic 38, an entry shift control logic 39, and a reorder buffer entry 40. The reorder buffer #1 (24b) has also the similar configuration to that of the reorder buffer #0 (24a).

The reorder buffer entry 40 includes entries of an entry effective bit 41 showing whether data stored therein is effective or not, a result writing designation tag 42 used at the time of writing-back the result from the arithmetic unit 28, a register number 43 for designation of the re-writing position to the register file 25, a thread generation bit 44 showing necessity to transfer the register data to the child thread after a fork instruction, an arithmetic data storing memory 46 storing the result from the arithmetic unit 28, and an arithmetic data storing memory effective bit 45 set when the result is stored in the unit 28.

In the reorder buffer 24, the entry is reserved according to the instruction order of the program upon receipt of the instruction from the instruction decoder 23. Specifically, it means that the entries are aligned in the program order. Moreover, when the entry cannot been reserved, the instruction decoding is stopped. In addition, when the instruction after executing the fork instruction is stored, the thread generation bit 44 is set.

Furthermore, the reorder buffer 24 receives also the reference numbers of source registers from the instruction decoder 23, and compares the source register reference number with the register number 43 the reorder buffer entry 40. When the same entry exists, the content of either the arithmetic data storing memory 46 or the result writing designation tag 42 in the newest entry among them is sent to the register data selector unit 26. When the content of the arithmetic data storing memory 46 is sent thereto, this is the case where the computation for that entry is completed and the arithmetic data storing memory effective bit 45 is set. Furthermore, in case where the content of either the arithmetic data strong memory 46 or the result writing designation tag 42 is sent to the register selector unit 26 of other processor 21, an entry is preferencely selected, to which the thread generation bit 44 is not set. Thus, it is prevented the register change data of the parent data after the fork instruction from being sent to the child thread. The register data supply decision logic 38 performs these processing.

In case where the arithmetic result comes from the arithmetic unit 28, it is written to the arithmetic data storing memory 46 of the entry having the same result writing designation tag 42, and the arithmetic data storing memory effective bit 45 is set. Moreover, the one for which the computation has been completed is written-back to the register file 25 according to the program order, and the entry is shifted to the subsequent one from the first one by the entry shift control logic 39. It should be noted that it may be managed as a ring buffer without performance of shifting. Moreover, in case where the fork instruction has been perfectly completed according to the program order, the thread generation bits 44 of all entries are reset.

Figure 12:
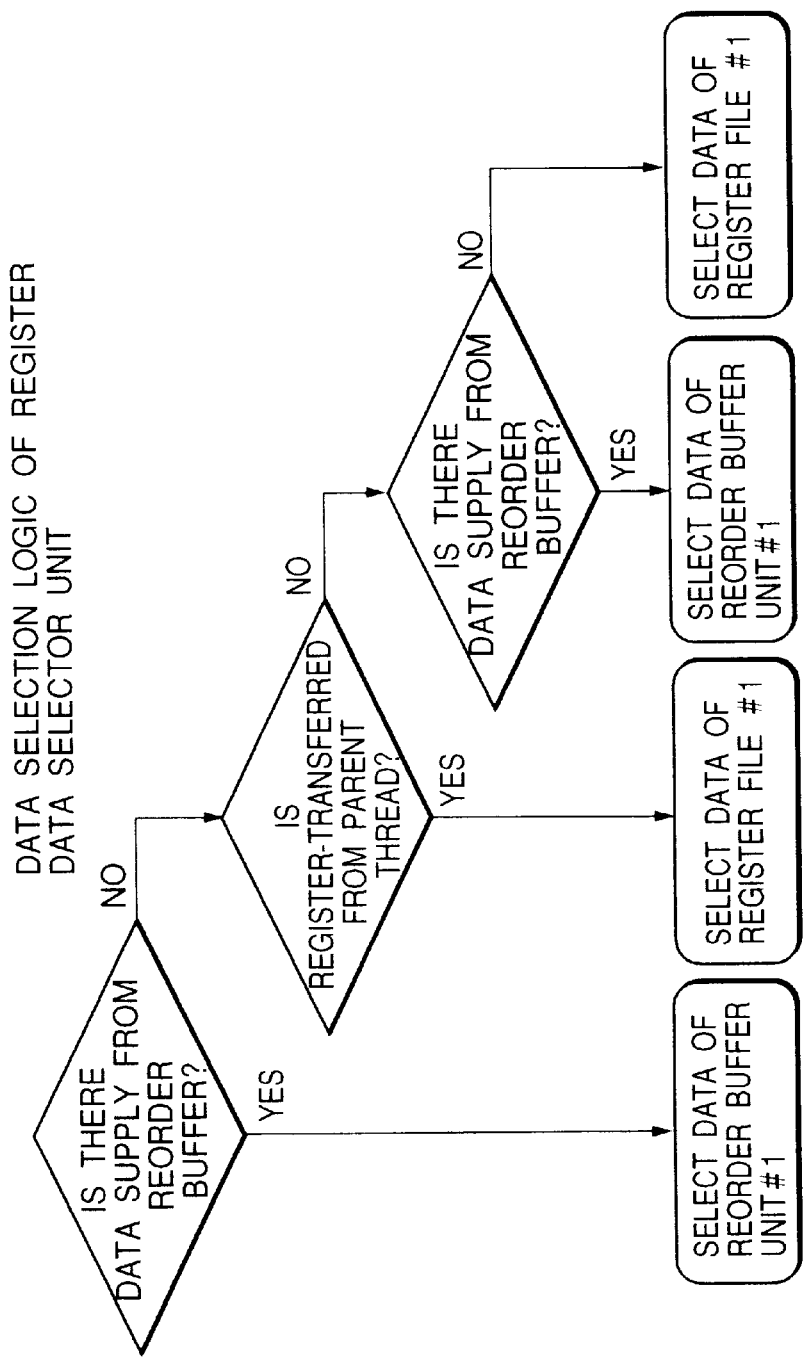
FIG. 12 is a flow chart showing processing logic of a register selection unit #1 (26b) in the third embodiment of the present invention.

Referring to FIG. 12, the register data selector unit #1 (26b) selects the data to be supplied to the instruction queue #1 (27b) among input data to the reorder buffer #1 (24b), the register file #1 (25b), the reorder buffer #0 (24a) and the register file #0 (25a). The register data selector unit #0 (26a) also operates according to the similar logic to the unit #0 (26b).

Next, an operation of the processor of the third embodiment will be described.

The processor 21a and 21b in FIG. 9 usually perform their processing independently from each other except for the time when the thread is generated. Therefore, the data is never supplied to the register data selector unit 26 from the reorder buffer 24 or the register file in the other processor 21. The register data selector unit 26 selects the data from reorder buffer 24 or the register file 25 of the processor 21 including the unit 26 if the data is ready for being used.

Figure 13:
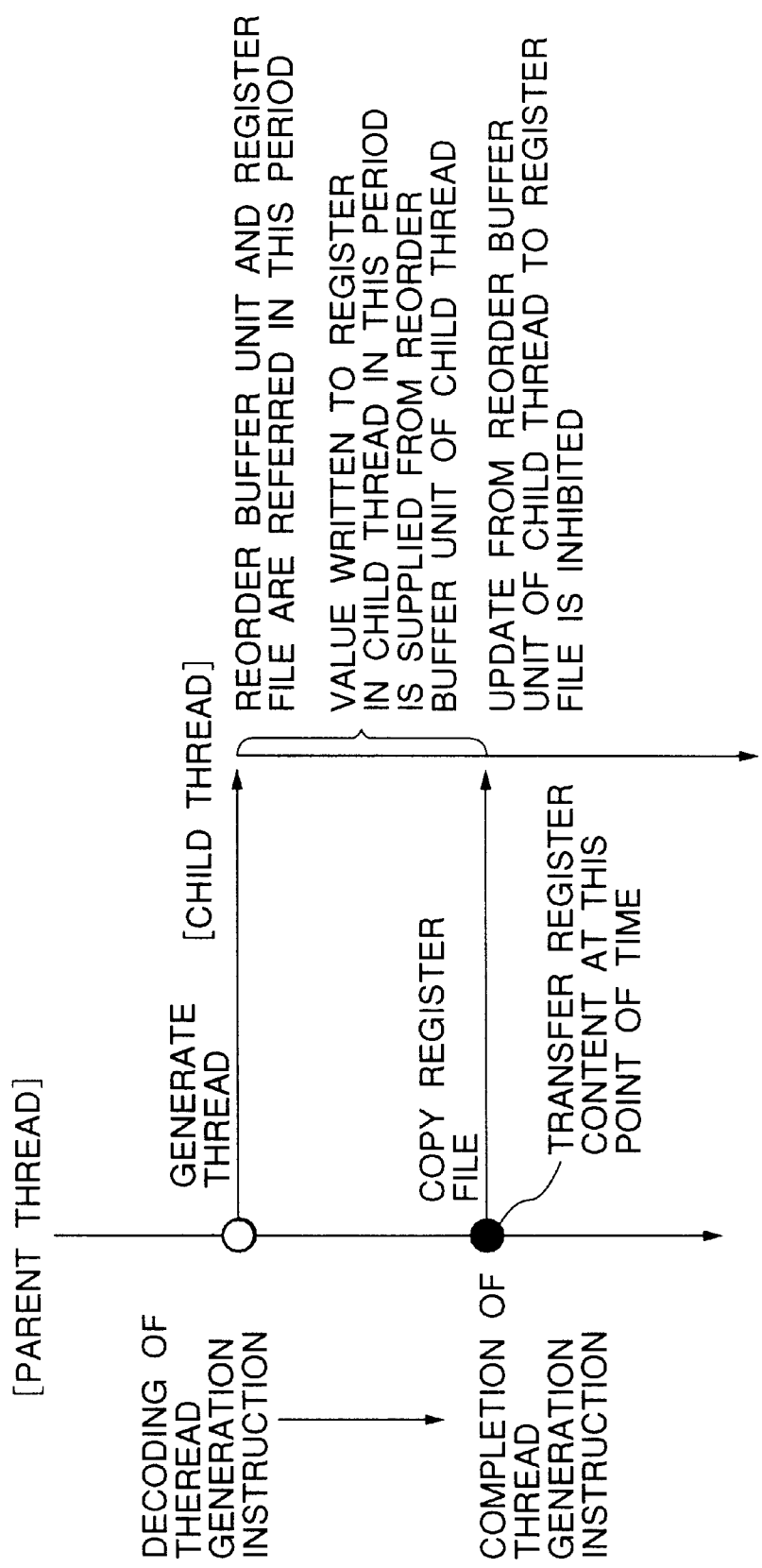
FIG. 13 is a view showing an operation model at the time of fork in the third embodiment of the present invention.

Referring to FIG. 13, an operation model at the time of fork in the third embodiment is shown. When the fork instruction is decoded by the processor #0 (21a), an execution for the child thread in the processor #1 (21b) is started according to the instruction from the thread manager 29. However, since the data of the parent thread is not inherited to the register file #1 (25b), the data of the register file #0 (25a) and the reorder buffer #0 (24a) are selected by the register data selector unit #1 (26b), and the arithmetic unit #1 (28b) performs a computation using the selected data. The result of this computation is stored in the reorder buffer #1 (24b). Therefore, at the time when the subsequent instruction is executed, the data from one of the register file #0 (25a), the reorder buffer #0 (24a) and the reorder buffer #1 (24b) is selected by the register data selector unit #1 (26b), and the arithmetic unit #1 (28b) performs a computation using the selected data.

On the other hand, at the time when the fork instruction is perfectly completed according to the program order on the parent thread side, all of the values of the register file #0 (25b) are decided as the values at the time of executing the fork instruction. At this time, the content of the register file #0 (25a) is copied onto the register file #1 (25b) by the thread manager 29. When this operation is completed, since the value of the parent thread is inherited to the register file #1 (25b), the data of the register file #1 (25b) and the reorder buffer #1 (24b) are selected by the register data selector unit #1 (26b) and a computation is performed using these data. Moreover, at this point of time, an update operation for the register file #1 (25b) by the reorder buffer #1 (24b) will be possible. Thus, also in the processor which performs the out-of-order execution, inheritance of the register content will be possible.

Next, a fourth embodiment of the present invention will be described. The fourth embodiment is equivalent to the third embodiment when the fourth embodiment is configured so that the instruction queue 27 and the arithmetic unit 29 are shared between the threads.

Figure 14:
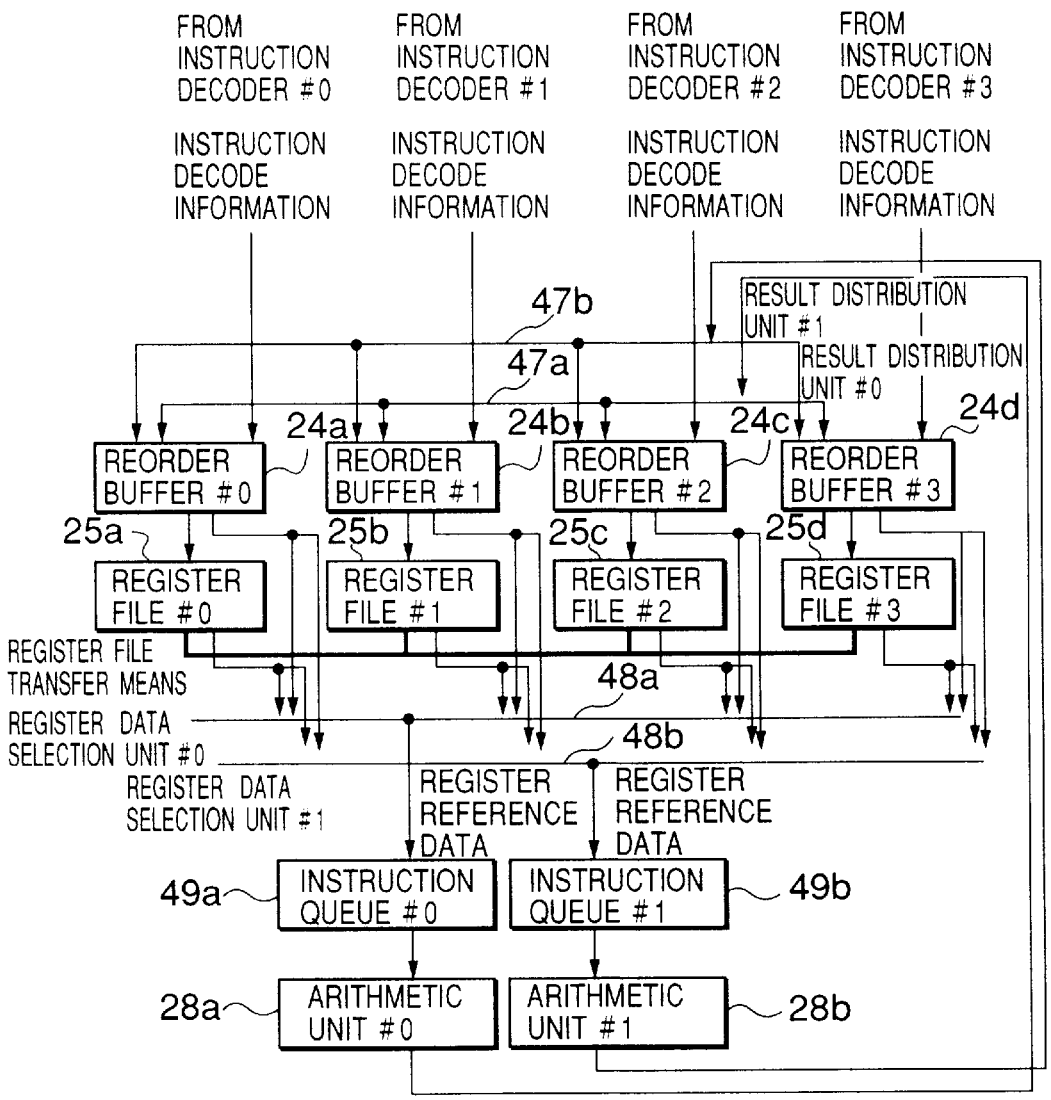
FIG. 14 is a block diagram of a processor of four-thread parallel execution two-ALU type in a fourth embodiment of the present invention.

Referring to FIG. 14, in a four-thread parallel execution two-ALU (arithmetic unit) type processor in the fourth embodiment of the present invention, an instruction cache, an instruction decoder, a thread manager and the like are omitted. However, the processor of the fourth embodiment has the similar configuration to that of the third embodiment in FIG. 9. In the processor of the fourth embodiment, result distribution units 47a for distributing the result from the arithmetic unit 28 to the reorder buffer 24 and 47b are included therein. Relating to this, the instruction queue includes an entry for storing the decoder by which the instruction is decoded. Moreover, the register data selector units 48a and 48b include information showing what instruction of the instruction decoder the selected register value deals with. Since the processor of the fourth embodiment of the present invention has a constitution composed of four threads, transfer means between the register files 25 realizes multi-pair and multi-inheritance so that for example, buses and the like can be used.

Next, a fifth embodiment of the present invention will be described.

Figure 15:
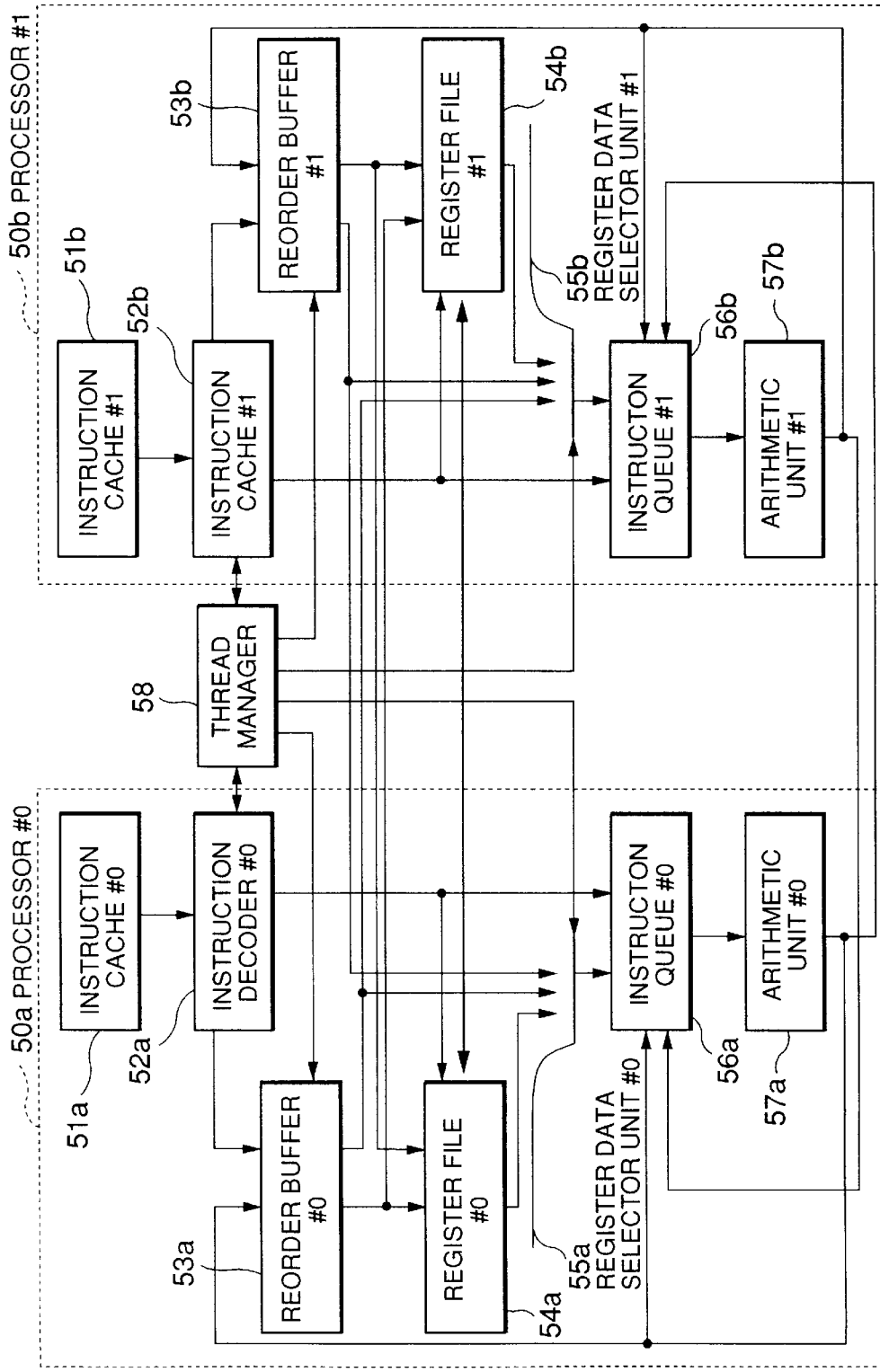
FIG. 15 is a block diagram of a processor of two-thread parallel execution type of a fifth embodiment of the present invention.

Referring to FIG. 15, a two-thread parallel execution type processor in the fifth embodiment of the present invention differs from that of the third embodiment shown in FIG. 9 in that a path for register content updating exists from the reorder buffer 53 to the register file 54 of another thread executing means 50 and no input from the register file 54 of another processor 50 to the input of the register selector unit 55 exists.

Figure 16:
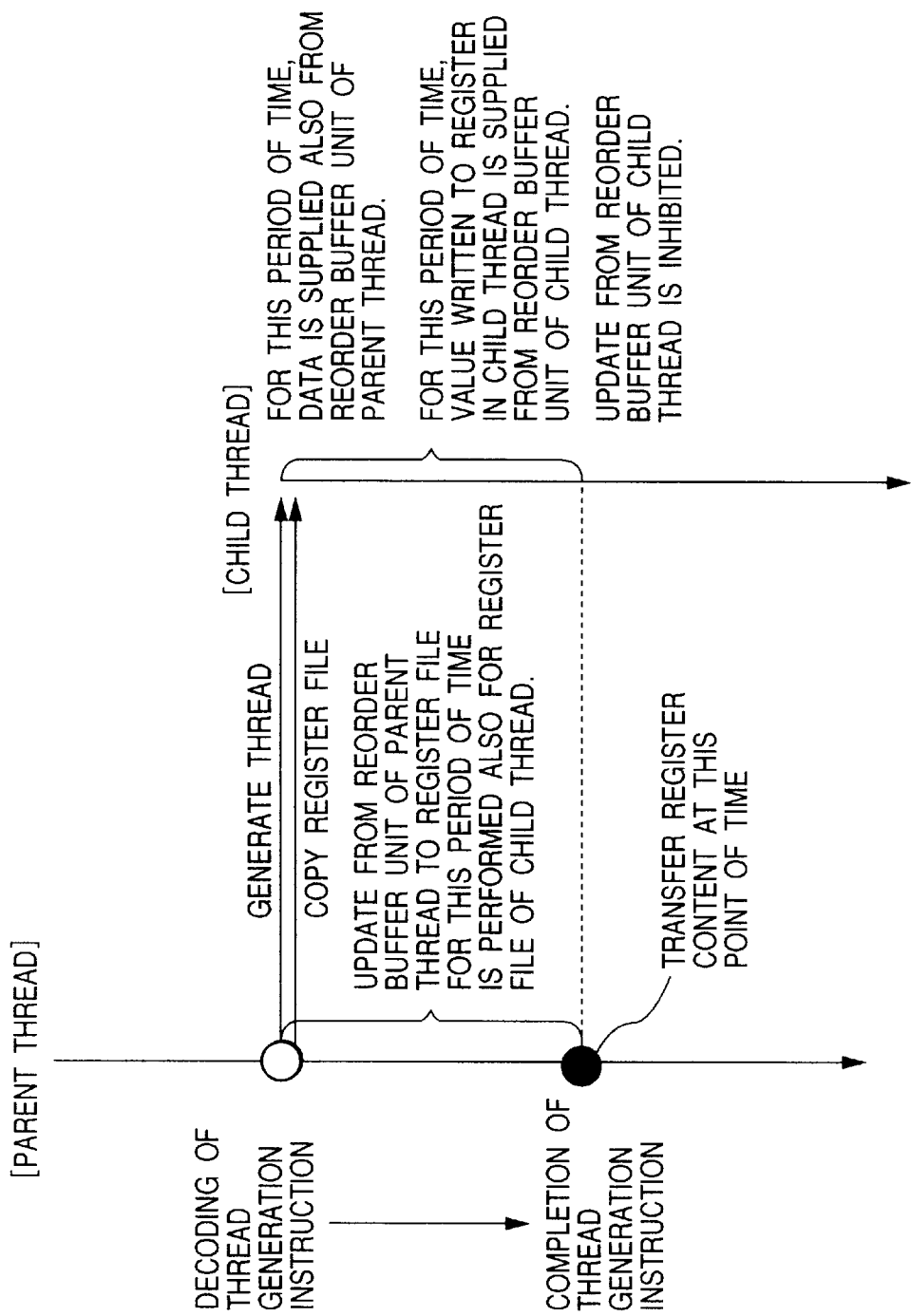
FIG. 16 is a view showing an operation model at the time of fork in the fifth embodiment of the present invention.

Referring to FIG. 16, an operation model at the time of the fork of the fifth embodiment is shown. When the fork instruction in the parent thread is decoded by the processor #0 (50a), the thread manager 58 instructs the processor #1 (50b) to execute the child thread. At the same time, the thread manager 58 instructs the register file #1 (54b) to copy the content thereof on the register file #1 (54b).

However, in the register file #0 (54a), since the update of the register by the instruction prior to the fork instruction is not perfectly completed, the update data is present in the reorder buffer #0 (53a) of the processor 50 of the parent thread. Otherwise, there is a possibility that the computation is not performed yet. Therefore, in the register data selector unit #1 (55b), after data of the register file #1 (54b) of the child thread, the reorder buffer #0 (53a) and the reorder buffer #1 (53b) are selected, the computation is performed.

On the other hand, at the time when the fork instruction is perfectly completed on the parent thread side according to the program order, supply of the data of the reorder buffer #0 (53a) to the register file #1 (54b) is not necessary. Therefore, the data of the register file #1 (54b) and the reorder buffer #1 (53b) are selected by the register selector unit #1 (55b) and computation is performed using these data. Moreover, at this point of time, the register updating operation for the register file #1 (54b) of the reorder buffer #1 (53b) is possible, and inheritance of the register content is realized in the processor which performs the out-of-order execution.

As described above, according to the fifth embodiment, since the arithmetic result of the parent thread is inherited to the register file of the child thread for which decision is not made to be executed, an execution for the child thread can be started at an early stage.

Next, a sixth embodiment of the present invention will be described.

In the foregoing fourth and fifth embodiments, the register transfer means is premised on, in which copying of the content of the register file is performed at a time (e.g., collectively) at the time of completion of the fork instruction or at the time of decoding. Since the content of the register file is copied at one time in this register transfer means, a high-band width is needed for this register transfer means. In the processor of the sixth embodiment, in order to cope with this requirement, inheritance of the register file is divided into several times.

Figure 17:
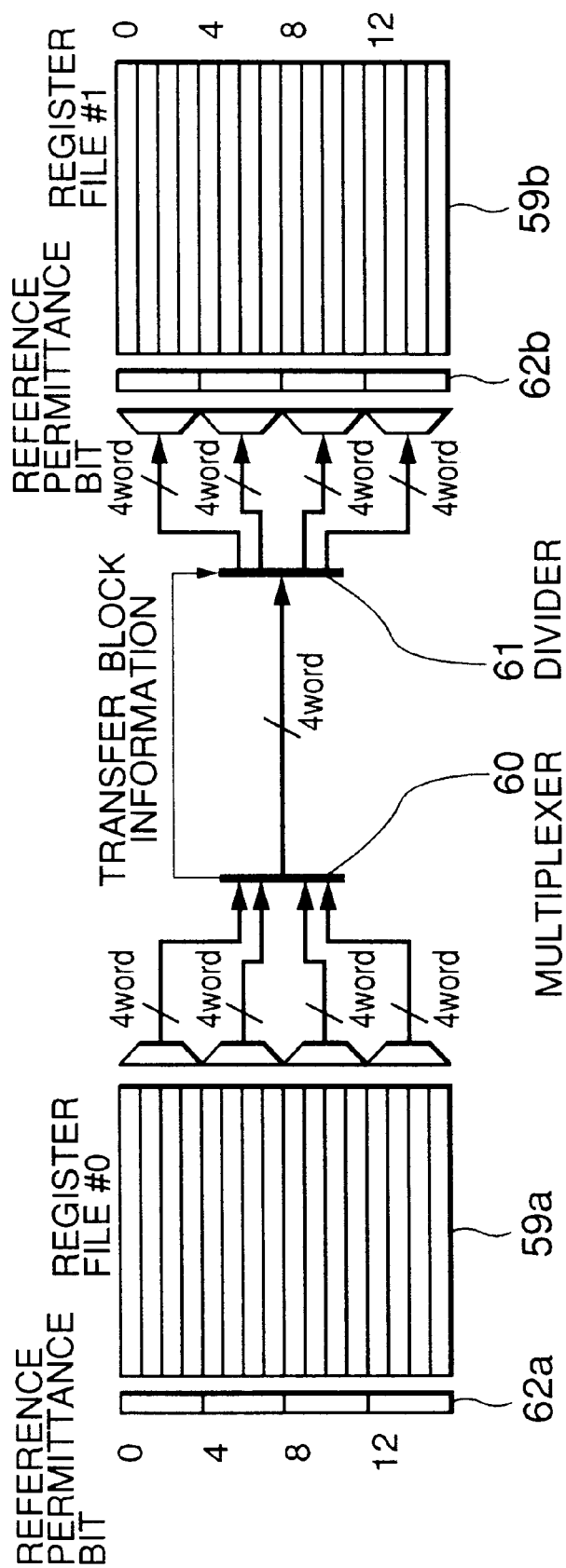
FIG. 17 is a block diagram of a processor of two-thread parallel execution type of a sixth embodiment of the present invention.

Referring to FIG. 17, 4-words 4-times inheriting type register transfer means between the 16-words register files in the sixth embodiment includes the register file #0 (59a) on the sender, the register file #1 (59b) on the receiver, the multiplexed 60, the divider 61, and the reference permission bits 62a and 62b. Specifically, in this sixth embodiment, an output of the register file is contracted by the multiplexer 60 on the sender side and the output of the register file is widened by the divider 61 on the receiver, whereby the band width of the register inheritance is reduced.

Figure 18:
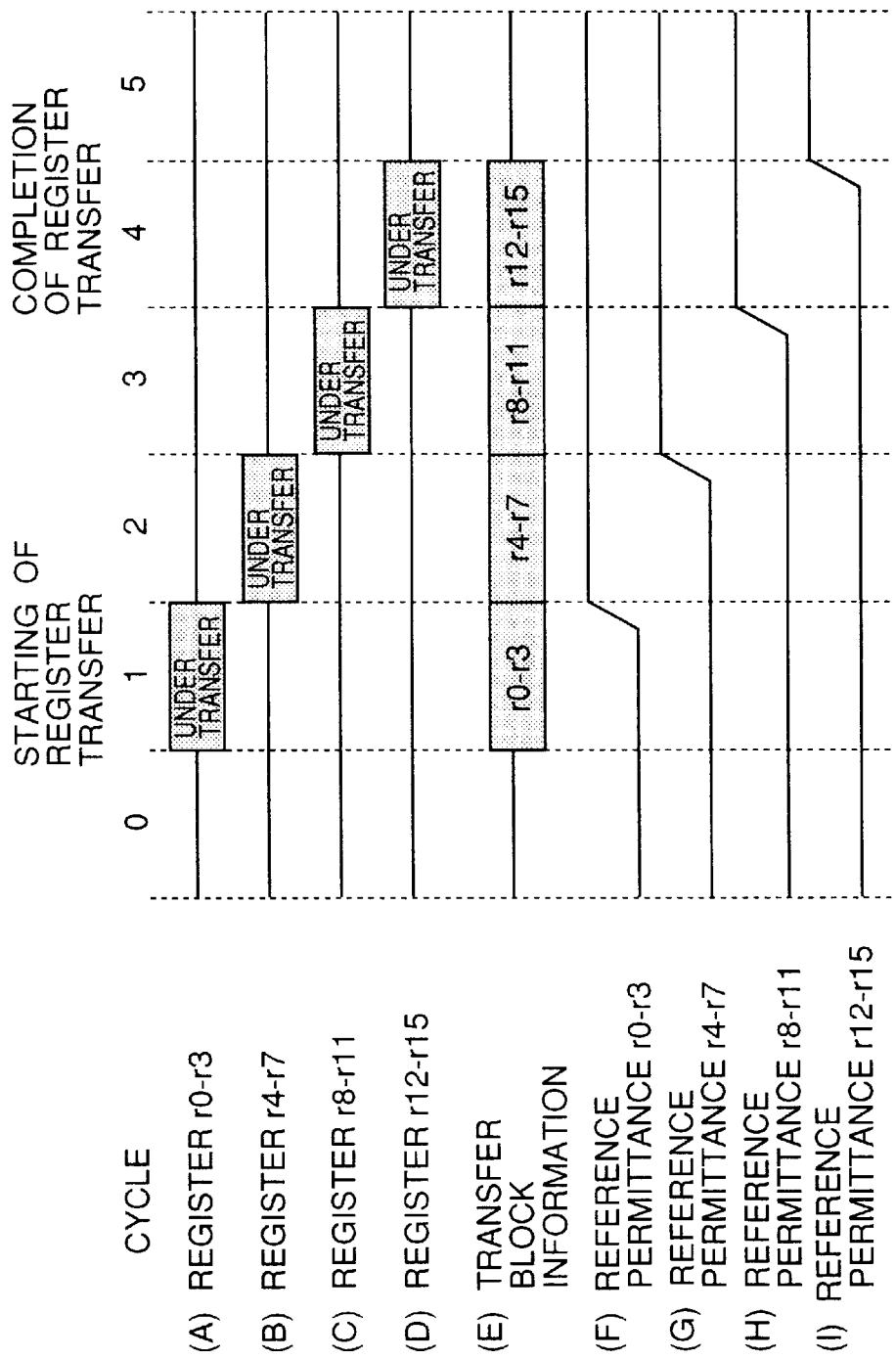
FIG. 18 is a timing chart in a sixth embodiment of the present invention.

In the timing chart of FIG. 18, reference symbols (A) to (D) indicate the register files in transmission, and (E) indicates information which register content is under transfer from the multiplexer 60 to the divider 61. Reference symbols (F) to (I) indicate the state of the reference permission bit 62b of the register file #1 (59b).

When copying of the register file 59 is started, the register file is transferred individually four times of r0–r3, r4–r7, r8–r11 and r12–r15. During of the transfer of the register file, an update of the register file #0 (59a) and reference of the register file #1 (59b) are inhibited. As soon as the transfer is completed, the update of the register file #0 (59a) and the reference of the register file #1 (59a) are sequentially permitted. The permission of the reference is performed by setting the reference permission bits 62a and 62b.

Although the number of the cycles is increased in which accessing of the register file is inhibited during the register inheriting, since the register accessing inhibitions are sequentially released. Therefore, by scheduling the codes to match with its characteristics and by delaying the access to the register which cannot be used, it will be possible to hide the latency to some degree.

Next, a seventh embodiment of the present invention will be described.

Figure 19:
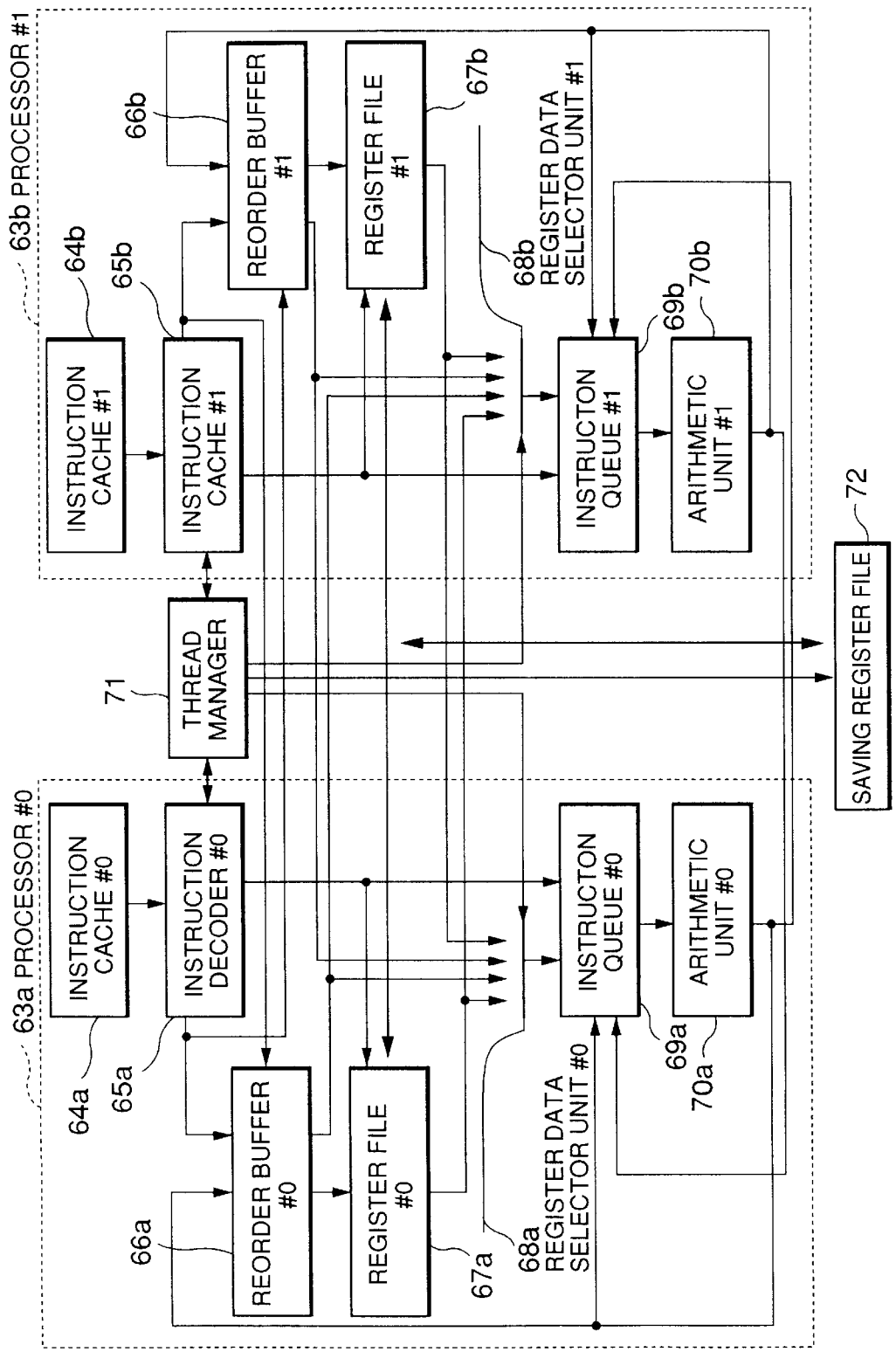
FIG. 19 is a block diagram of a processor of two-thread parallel execution type of a seventh embodiment of the present invention.

Referring to FIG. 19, the processor of the seventh embodiment differs from the fourth embodiment in that the processor of the seventh embodiment further includes an saving register file 72.

When the fork instruction is further executed at the time of no empty processor 63 existing, the processor which has executed the fork instruction performs copying of the value of the register file 67 on the saving register file 72 when the value of the register file 67 is decided. Thus, it is possible to cope with a request for the thread generation exceeding the number of the processor 63 without an intervention of a system managing software. At the time when some processor 63 becomes free, copying is performed for the register file 67 of the free processor 63 from the saving register file 72, whereby the execution of the thread which has been saved is restarted. Management for these is performed by the thread manager 71.

Next, an eighth embodiment of the present invention will be described.

Figure 20:
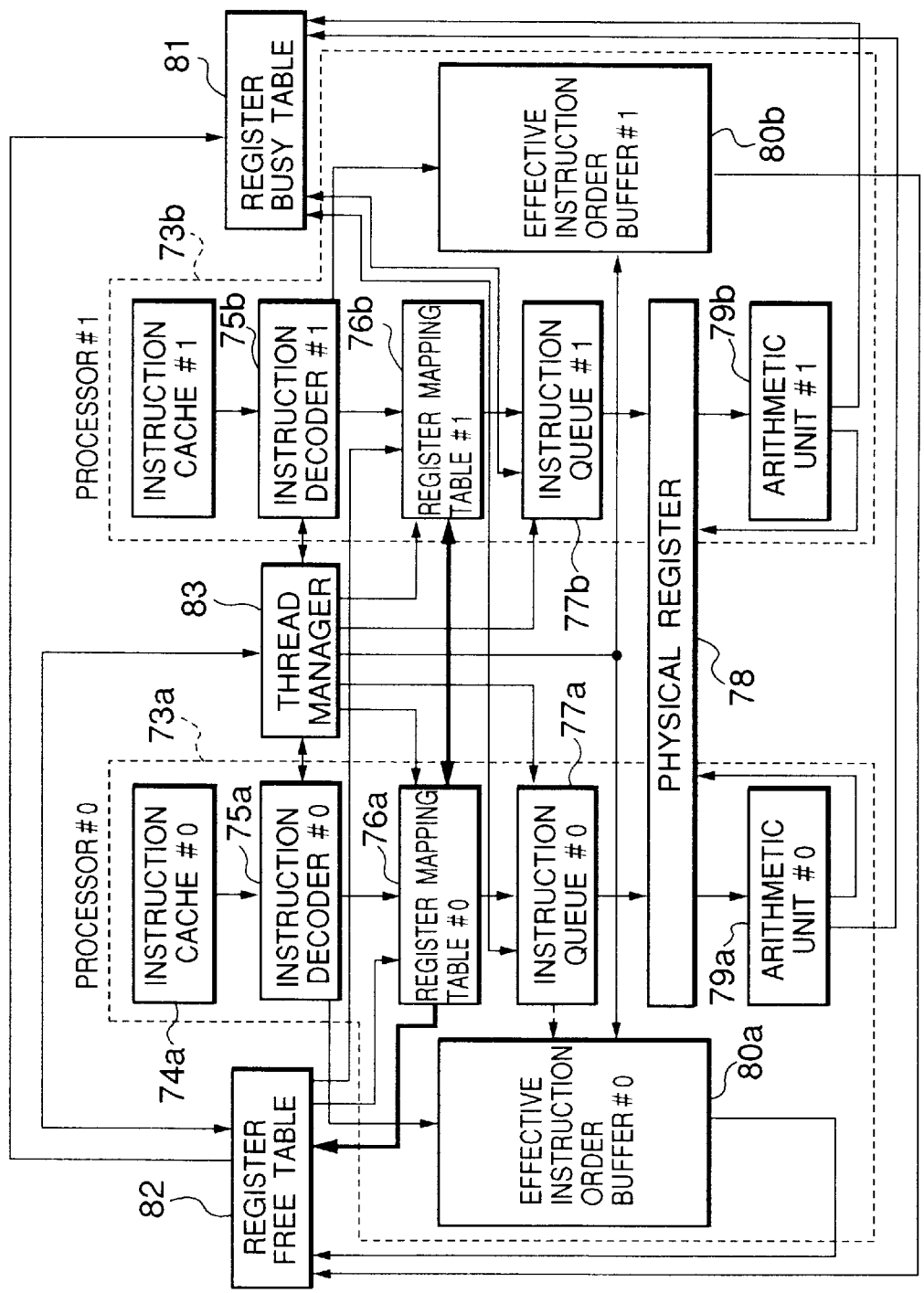
FIG. 20 is a block diagram of a processor of two-thread parallel execution type of an eighth embodiment of the present invention.

Referring to FIG. 20, a 2-thread parallel execution type processor of the eighth embodiment includes the processors 73a and 73b. The 2-thread parallel execution type processor further includes the physical register file 78 shared by these processors 73a and 73b, the register busy table 81, the register free table 82 and the thread manager 83.

The processors 73a and 73b include the instruction cache 74a or 74b, the instruction decoder 75a or 75b, the register mapping table 76a or 76b, the instruction queue 77a or 77b, the arithmetic unit 79a or 79b, and the effective instruction order buffer 80a or 80b, respectively.

In the eighth embodiment of the present invention, the register is divided into the logic register to access from the software and the physical register to keep the register content using the software, and the mapping relation is kept in the register mapping table 76.

Figure 21:
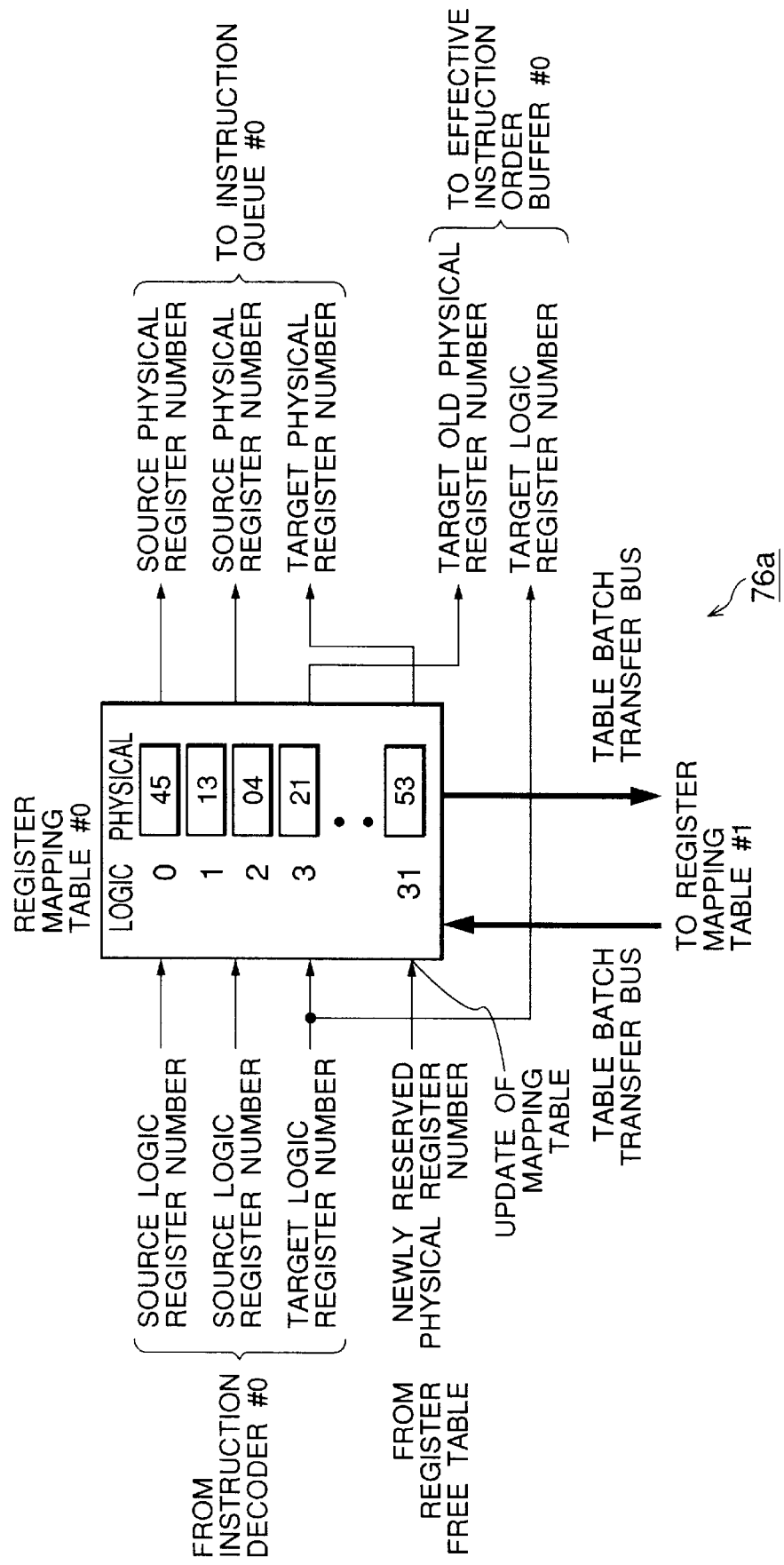
FIG. 21 is a detailed block diagram showing a register mapping table 76a in the eighth embodiment of the present invention.

Referring to FIG. 21, corresponding to the logic register number, the register mapping table 76a in the eighth embodiment stores the physical register number entry, whereby the logic register number is converted to the physical register number. The register mapping table 76b also has the similar constitution to that of the register mapping table 76a.

Figure 22:
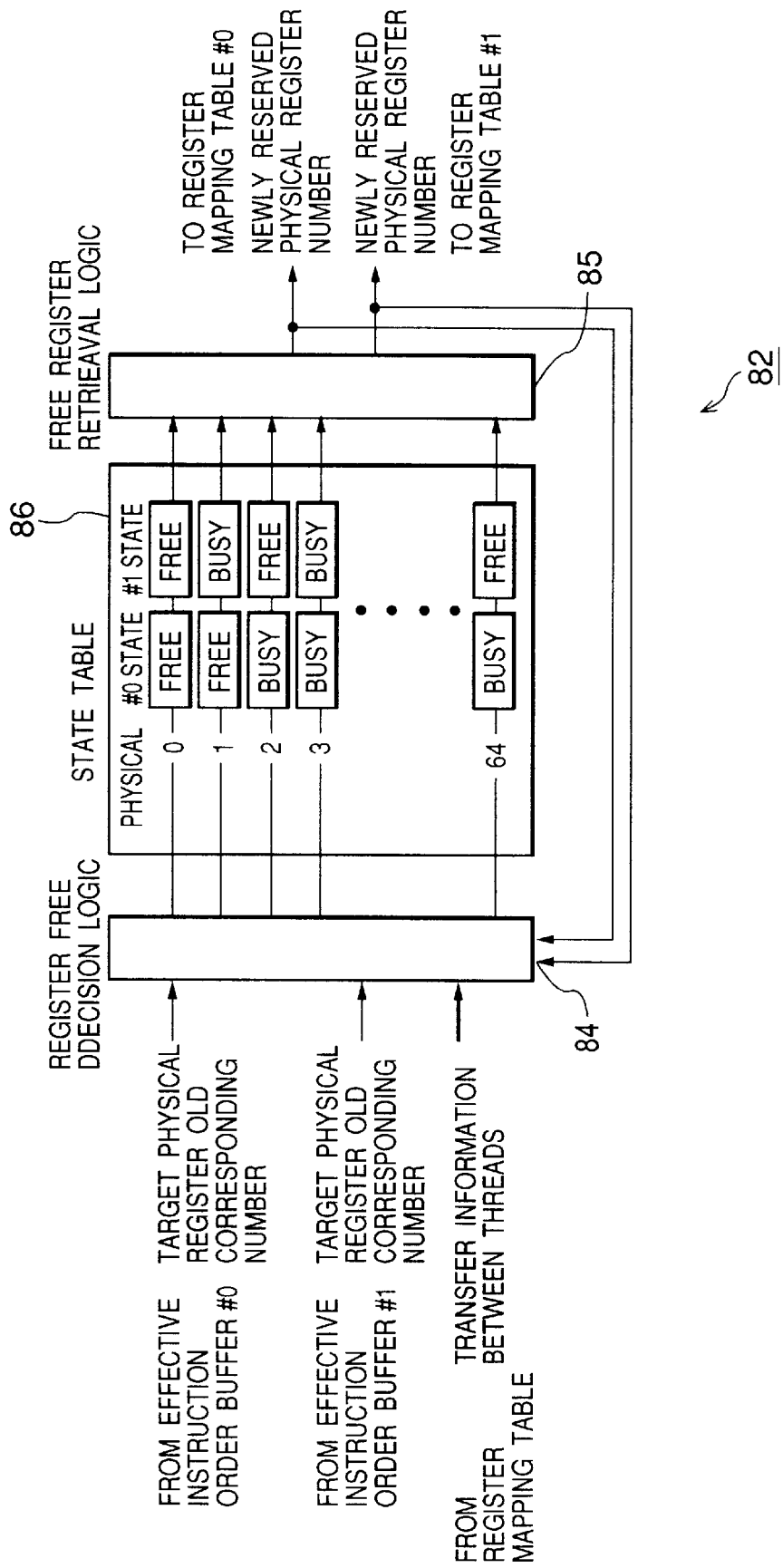
FIG. 22 is a detailed block diagram showing a register free table 82 in the eighth embodiment of the present invention.

Referring to FIG. 22, the register free table 82 includes the register free decision logic 84, the free register retrieval logic 85, and the state table 86. The state table 96 stores the use state of each physical register every processor 73. Specifically, "BUSY" indicates that the physical register is in use state, and "FREE" indicates that the physical register is in unused state. The register free decision logic 84 receives information indicating from which thread the register is inherited to other threads. At the same time, the register free decision logic 84 receiving information indicating by which processor the use of the physical register is completed. Thus, the register free decision logic 84 decides the state of the entry of the state table ("FREE" or "BUSY"). The free register retrieval logic 85 selects the physical register in which all of the states concerning the physical register are "FREE" in the state table 86. The free register retrieval logic 85 selects the registers of the number corresponding to that of the processor and that of the instructions simultaneously decoded.

Figure 23:
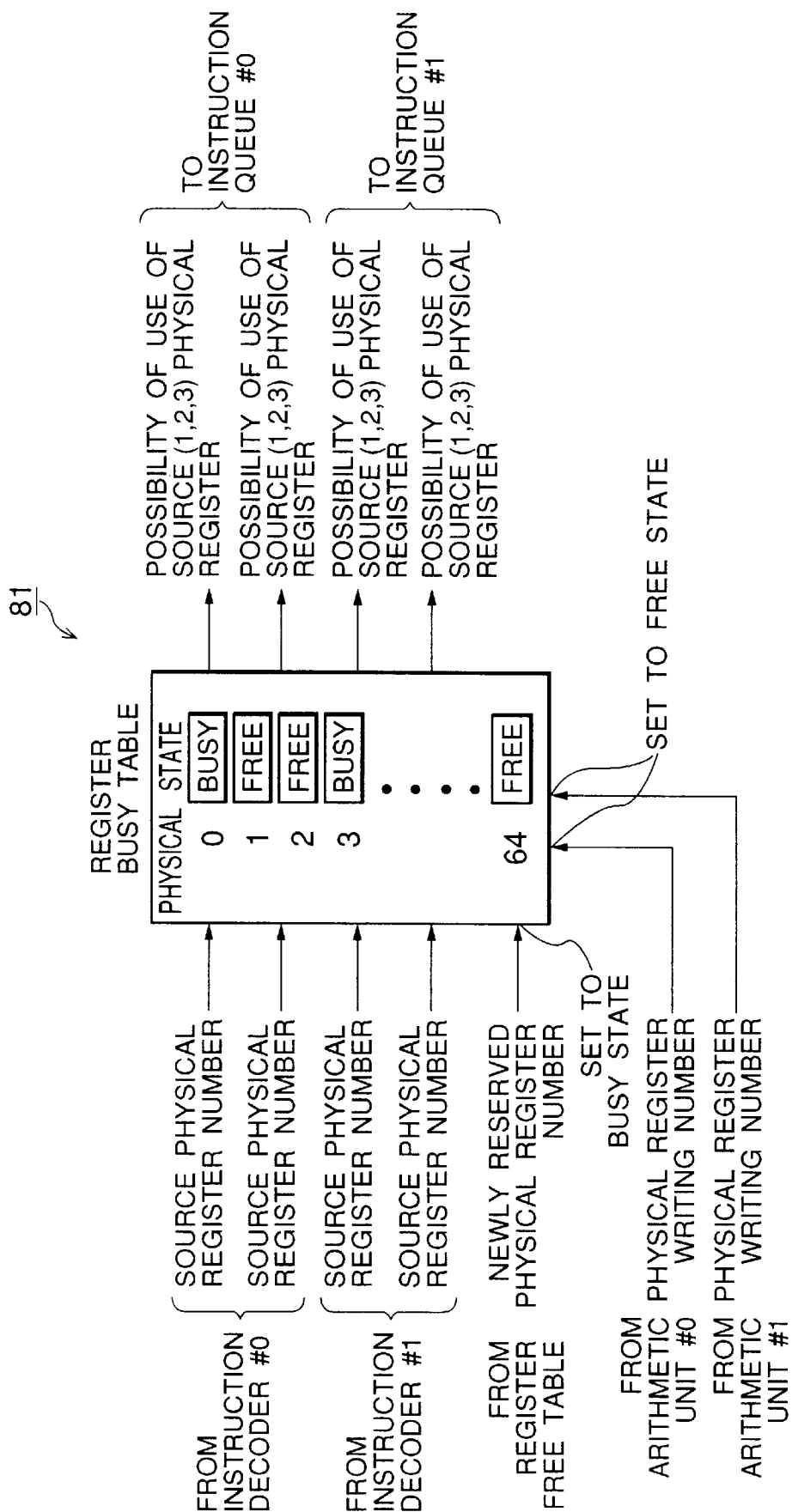
FIG. 23 is a detailed block diagram showing a register busy table 81 in the eighth embodiment.

Referring to FIG. 23, the register busy table 81 stores whether each of the physical registers can be used or not. Specifically, "BUSY" indicates that reading-out is impossible, and "FREE" indicates that reading-out is possible. The newly reserved physical register inhibits the reading-out assuming that is in "BUSY" state until writing is actually produced. Thereafter, after the writing has been produced, it permits the reading-out by changing the state from "BUSY" to "FREE".

When the instruction is decoded by the instruction decoder 75, the logic register number which is a reading-out object and the logic register number which is a writing object are known. The logic register number which is the reading-out object is instantly converted to the physical register number by the register mapping table 76, and is stored in the instruction queue.

For the logic register which is the writing object, the new physical register is used by reserving it. This is for keeping the validity for the prior instruction to refer the same logic register according to the currently decoded instruction, when the out-of-order execution is performed. For example, when the instruction which is expressed as the following order is executed according to the out-of-order execution, 10: add r1←r2+r3
14: sub r3←r4−r3 the instruction of the address "14" is executed, and the instruction of the address "10" reads the value of register r3 which is updated. In such case, it becomes impossible to keep the validity of the program. By mapping register r3 of the address "10" and register r3 of the address "14" on the different physical registers, the value of register r3 before the execution is previously kept in spite that the instruction of address "14" is executed, the value of register r3 before the execution is referenced from the prior register mapping relation at the time of execution of the address "10". For this reason, the physical register which is not currently used is reserved from the register free table 82. Mapping information of the register mapping table 76 is updated as the corresponding relation between the logic register and the physical register.

At the time of the instruction decoding, the necessary information is stored in the effective instruction order buffer 80 according to the program order of the instruction. Here, when the mapping relation between the new logic register and the physical register is generated by the decoded instruction, the register mapping relation before the execution of the instruction is also stored together with the foregoing necessary information. This is because the register mapping relation before the execution of the instruction is necessary at the time of releasing the physical register and canceling the processing.

The physical register is released when the instruction is perfectly completed according to the program order. For example, 10: add r1←r2+r3
14: sub r3←r4−r2 in case of the order as described above, the physical register corresponding to r3 which has been used until the address "10" at the time of completion of the instruction of the address "14" is released. The physical register of r3 reserved in the address "14" is released when the instruction updating the subsequent r3 is perfectly completed according to the program order. However, in case where the register content is inherited to the child thread, the physical register of r3 is not released perfectly, until the child thread side is similarly released. In case where the register content is inherited to the child thread, the physical register is perfectly released when both of the child and parent threads are released. Specifically, when all entries of the state table 86 are reset, this register becomes an empty state.

Next, an operation of the processor of the foregoing eighth embodiment will be described.

The processor of FIG. 20 performs the thread generation and carries forward the processing by the processor 73 except the time of completion. Although the physical register file 78, the register busy table 81 and the register free table 82 are shared, each simultaneously processes different requests every thread.

In the processor in FIG. 20, when the fork instruction is decoded, the content of the register mapping table 76 is copied on the register mapping table 76 of another processor 73 which is empty. At the same time, copying is performed for register free table 82. The register free table 82 which has received this information sets the state table in the processor of the child thread to "BUSY". Since the content of the register mapping table 76 is changed according to the program order at the time decoding, the register mapping table 76 is holding the correct mapping information at the time of fork instruction decoding. Therefore, it is possible to perform normal reference for the physical register file 78 also from the child thread, like the case of the parent thread. Moreover, since mapping is performed, after thread generation, for the physical registers which have performed writings to the same logic register, it is possible for each thread to perform processing independently from other threads. At the time of thread completion, the state table 86 of this processor 73 of the register free table 82 is cleared.

As described above, in the processor of the eighth embodiment of the present invention, the inheritance of the register content in the out-of-order is realized. In this embodiment, the quantity of information is small compared to the processors of the fourth to seventh embodiments. Moreover, the processor of this embodiment is characterized by that a special control until the fork instruction is completed on the parent thread according to the program order is unnecessary.

Next, a ninth embodiment of the present invention will be described.

In the processor of this embodiment, the content of the register mapping table is inherited a plurality of times in the divided state, instead of inheriting the content of the register file, compared to the sixth embodiment. The principal constitution for inheriting is the same as that of FIG. 17.

According to the ninth embodiment of the present invention, it will be possible to transfer the register content while further decreasing the band width of the register transfer. At the time of inheriting the register mapping table, although the cycle increases, in which accessing of the register file are inhibited, register accessing inhibitions are sequentially released. If code scheduling according to its characteristic is performed and accessing for the register incapable of being used is delayed, it will be possible to conceal this latency to some degree.

Next, a tenth embodiment of the present invention will be described.

Figure 24:
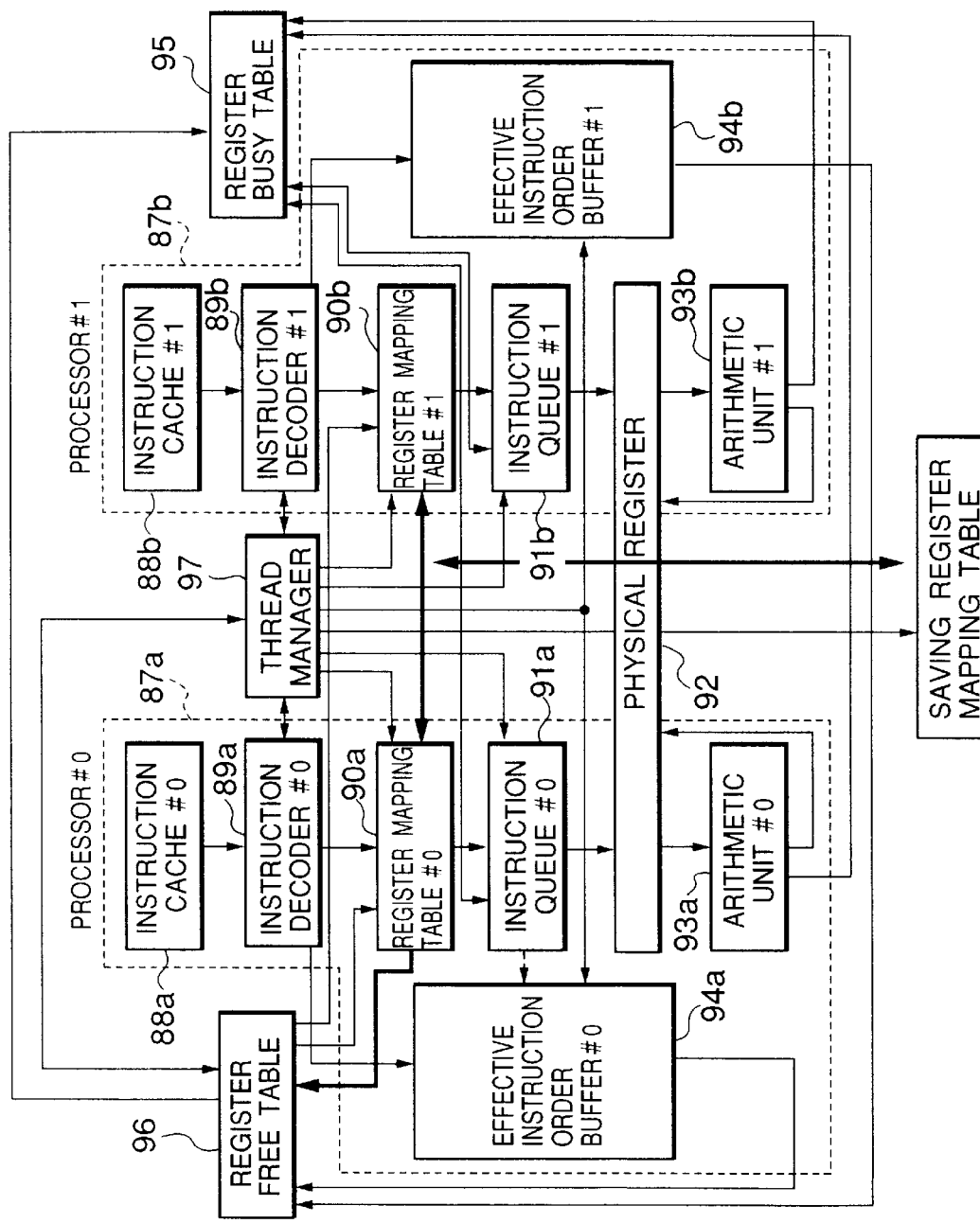
FIG. 24 is a block diagram of a processor of two-thread parallel execution type of a tenth embodiment of the present invention.

Referring to FIG. 24, compared to the eighth embodiment, the processor of this embodiment further includes the escaping register mapping table 98, and the saving register state table is added to the register free table 96.

In case where the fork instruction is further executed at the time of no empty processor 87 existing, the content of the register mapping table 90 is copied on the saving register mapping table 98 at the time of fork instruction decoding by the processor which has executed the fork instruction. Thus, without intervention by system managing software, the processor of this embodiment copes with the requests for thread generation which exceed the number of the processor 87. At the point of time when an empty position is produced in the processor 87, copying is performed from the saving register mapping table 98 to the register mapping table 90 of the empty processor 87, and the execution for the thread which has saved is restarted. The management for these is performed by the thread manager 97.

Next, an eleventh embodiment of the present invention will be described.

In the processor of this embodiment, the number of times for generating the according to the fork instruction for one thread is set to at least one, and the child thread is controlled so that the child thread is not completed until the parent thread is completed. By setting the number of times of the generation of the child thread to one, the generation/completion of the thread will be sequentially performed.

Figure 25:
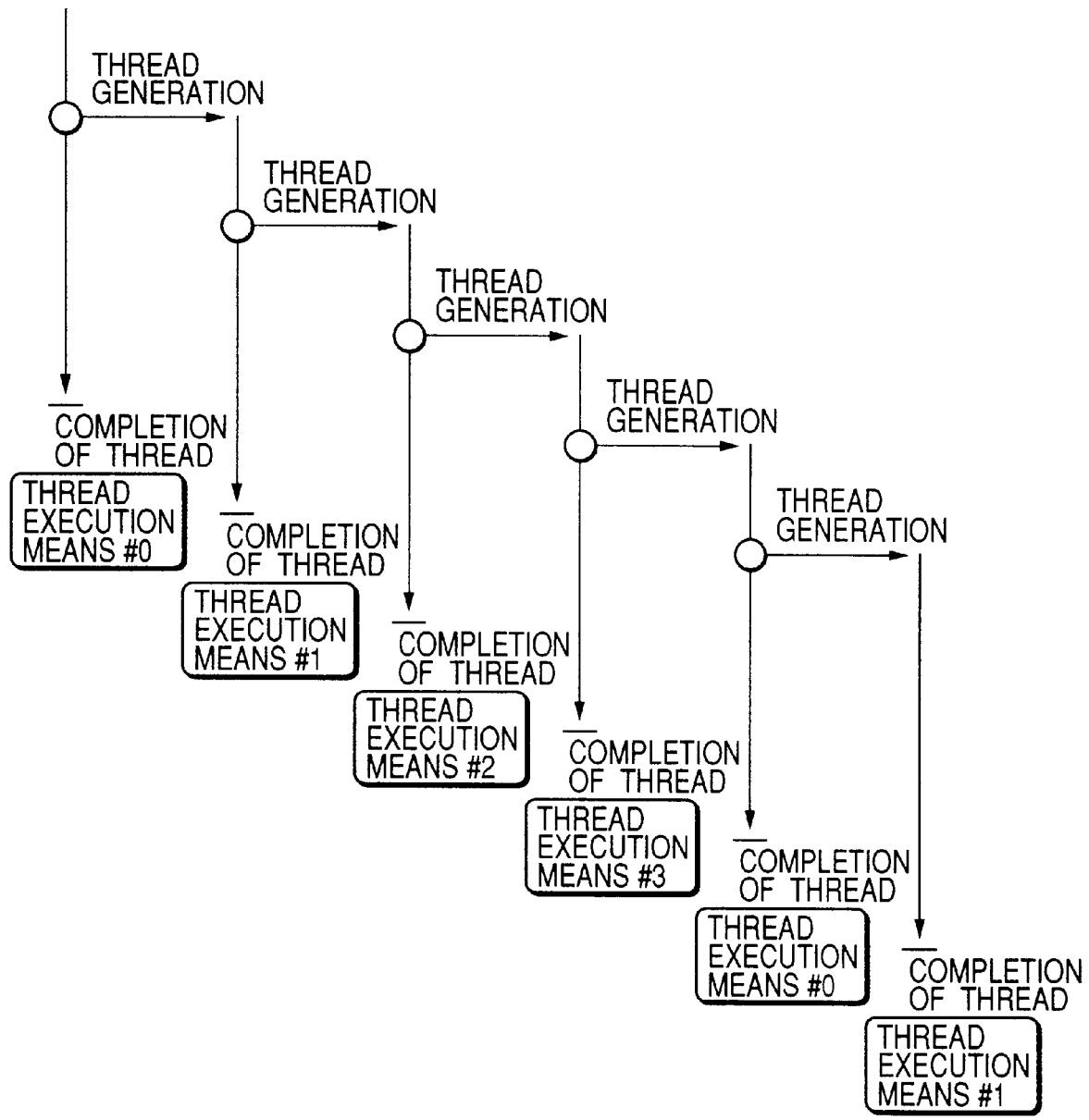
FIG. 25 is a view showing a model for thread generation in an eleventh embodiment.

Referring to FIG. 25, the destination of the generation of the child thread generated by the fork instruction can be limited to the adjacent processor. Specifically, the fork is always performed for the processor #1 from the processor #0, and the thread is developed to the processor showing the ring shape, for example, from the processor #1 to the processor #2, from the processor #2 to the processor #3, and from the processor #3 to the processor #0. Therefore, the register transfer means or the register mapping table in the fourth to tenth embodiments, which have a multi-pair multi-structure, can be constituted so as to have a simplified ring-shaped structure.

Figure 26:
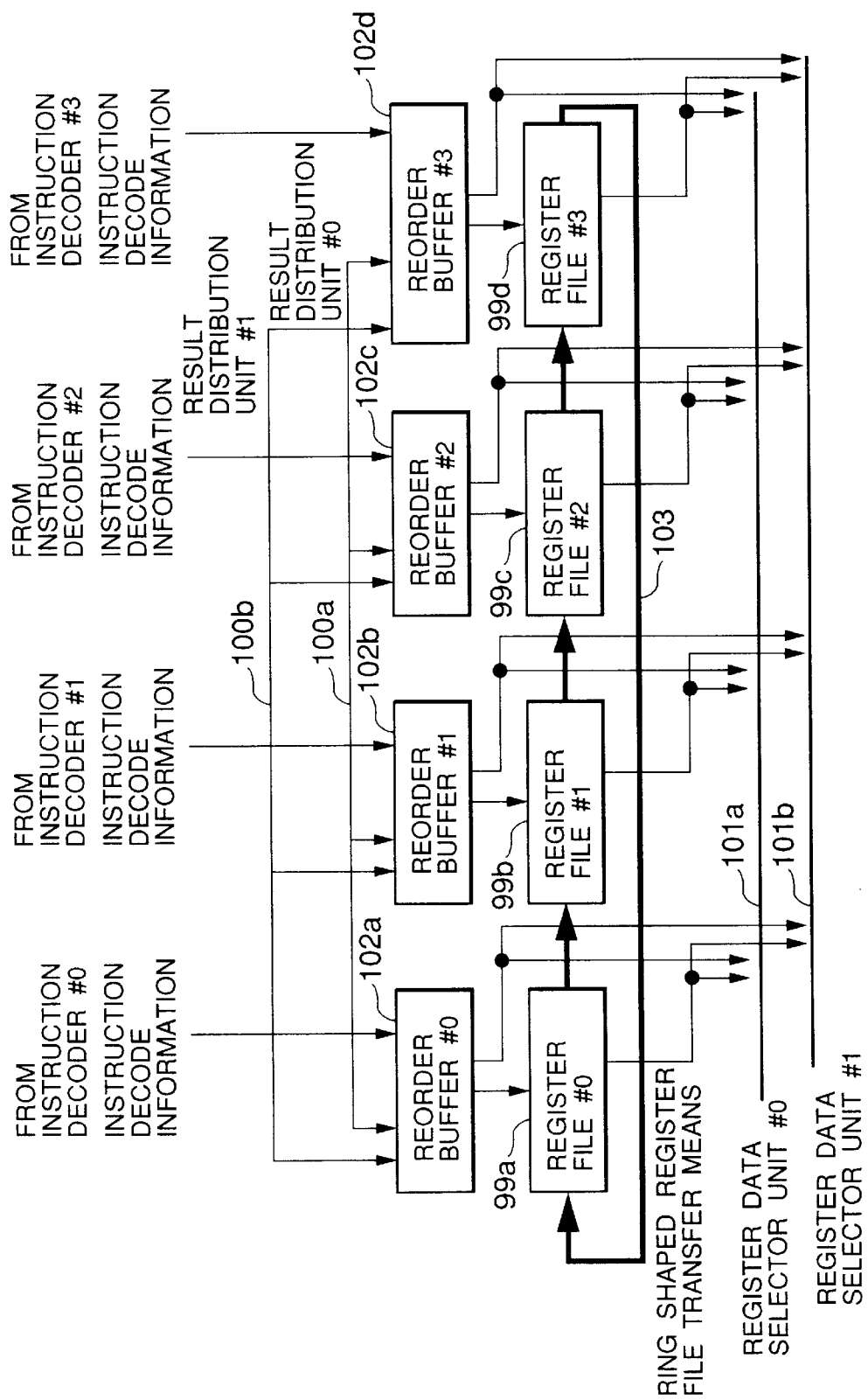
FIG. 26 is a block diagram showing a periphery portion around a register file in the eleventh embodiment.

Referring to FIG. 26, for example, if the eleventh embodiment is applied to the fourth embodiment shown in FIG. 14, the register file 99 can be constituted by the ring-shaped register file transfer means 103. Specifically, in case where the number of the processor is three or more, the connections of the buses for copying between the register files can be limited to that between the adjacent registers. According to the eleventh embodiment, further effective hardware mounting will be possible, as described above.

Next, a twelfth embodiment of the present invention will be described.

In the twelfth embodiment, the feature that the thread generation is limitedly once performed in the eleventh embodiment is added to this embodiment, compared to the eighth embodiment. Thus, without inheriting the physical register transfer information to the register free table at the time of the fork, the transfer of the register content to the child thread can be realized, while realizing renaming of the logic register physical register.

Figure 27:
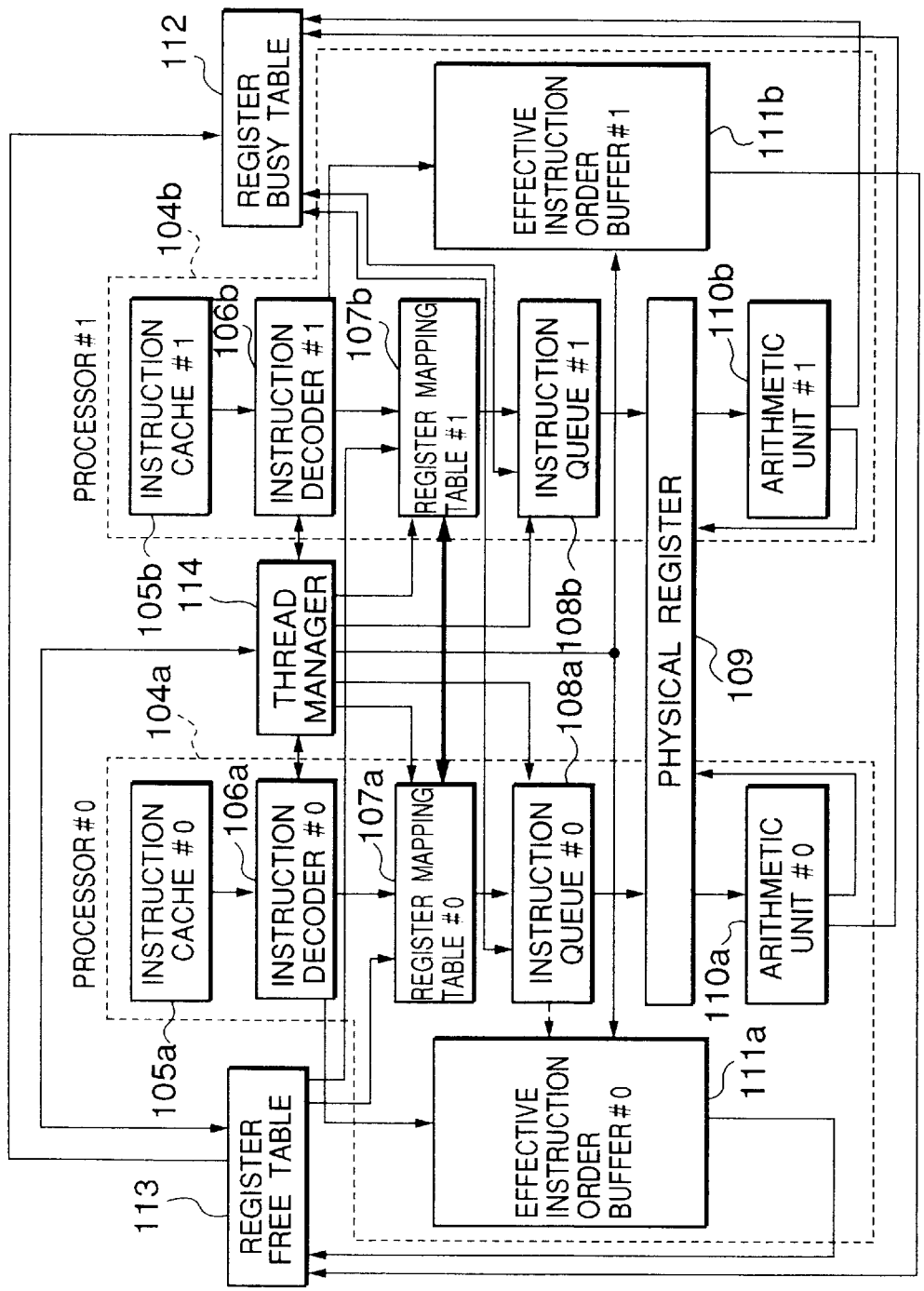
FIG. 27 is a block diagram of a processor of two-thread parallel execution type of a twelfth embodiment of the present invention.

Referring to FIG. 27, in the embodiment of the twelfth embodiment, means for transmitting, at the time of the fork the transfer of the physical register from the register mapping table 107 to the register free table 113 is omitted compared to the eighth embodiment.

Figure 28:
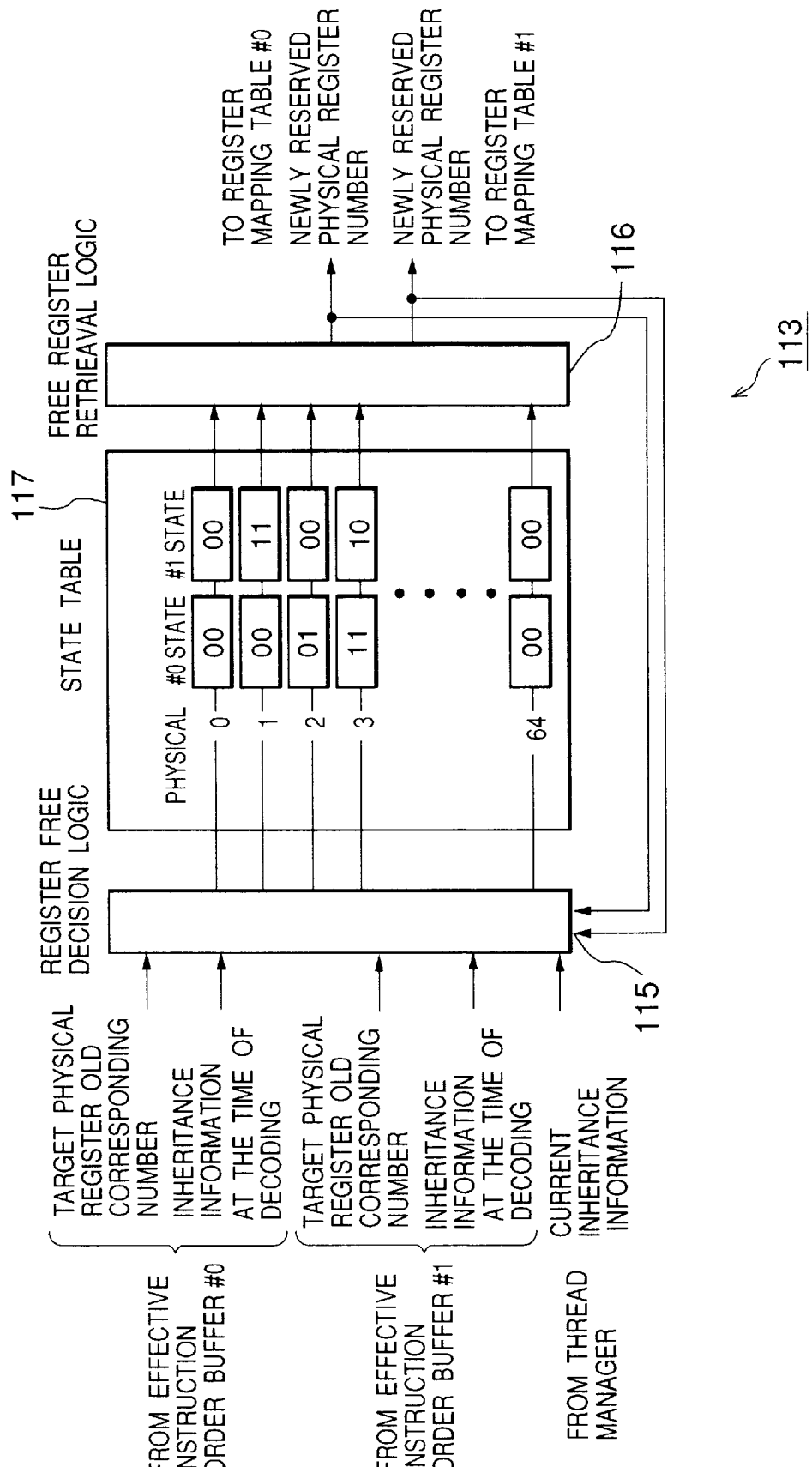
FIG. 28 is a view showing a register free table 113 in the twelfth embodiment of the present invention, in detail.

Referring to FIG. 28, in the register free table 113, the entry of each processor 104 of the state table 117 is extended to 2-bits.

Referring to FIG. 29, the meaning of the foregoing extended 2-bits of the state table 117 is shown.

At the time of reserving the register, the value set in the state table 117 are changed depending on whether the thread has performed the fork or not. Therefore, it is necessary to obtain from the thread manager 114 the information as to whether the thread has performed the fork or not. Moreover, the owner right in FIG. 29 is given to the state table 117 of the processor 104 which has reserved the register, and by the register inheriting after that, the owner right is sometimes assigned to the child thread. In case where the state tables 117 of each processor 104 are 00, the physical registers of the entry corresponding to the state tables are in unused state.

Hereinafter, the register opening logic will be described. This logic is decided by the register free decision logic 115.

In the description for this logic, an N-thread simultaneous execution processor model is dealt with. This is because the logic is simplified in case of a 2-thread simultaneous execution model. Moreover, it is assumed that the thread is generated first from the parent thread to the child thread and then from the child thread to the grandchild thread. Here, the logic at the time when the register is opened at the time of completion of the instruction order in the child thread is shown in FIG. 30.

As is apparent from FIG. 30, when the inheritance of the register to the grandchild thread is being performed, the three kinds of field values of the parent thread, the child thread and the grandchild thread are decided, and the state transition in response to the fork state of the thread which is to be opened is also decided. The state transition other than this can not normally exist, and it will be error.

By using this logic, the register free table 113 can transfer and open the register without changing the contents of many state tables 117 at the time of executing the fork instruction.

Figure 31:
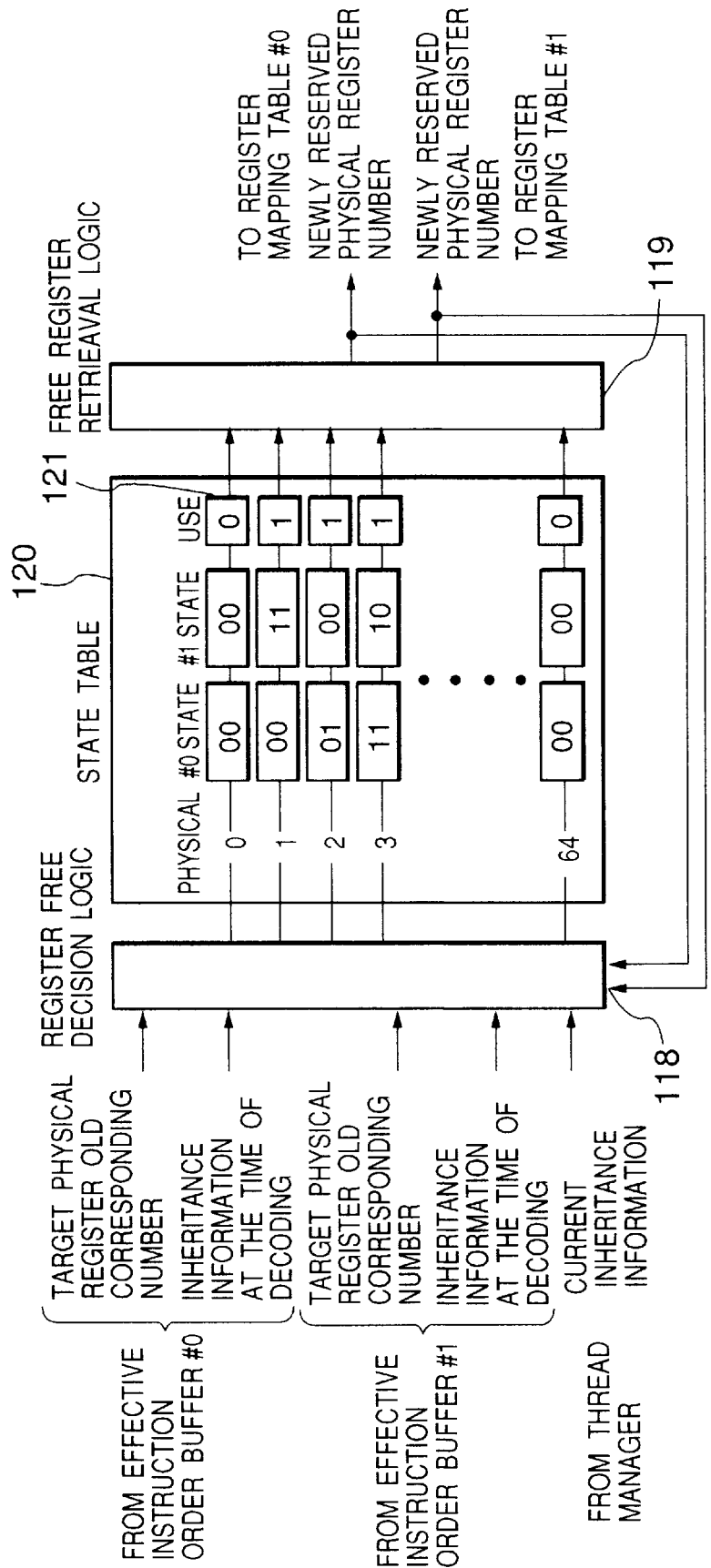
FIG. 31 is a view showing a register free table 113 in a thirteenth embodiment of the present invention.

Referring to FIG. 31, in a thirteenth embodiment of the present invention, the register active bit 121 is added to the twelfth embodiment shown in FIG. 28. This register active bit 121 finds the unused register by the free register retrieval logic 119 at the time when the physical register is reserved, and set the unused register to be active. Thus, the logic for retrieving the register in the state in which all of the entries of the state table 120 are "00" or "unused" is simplified. Setting of the register active bit 121 from the active state to the unused state is performed at the time when the register free decision logic 118 reloads the content of the state table 120.

As described above, according to the present invention, when the threads are in parallel processed, it is possible to transfer the register content from the parent thread to the child thread without intervention of the shared memory, whereby an overhead at the time of thread generation can be reduced. Moreover, the transfer of the register content is made possible for the processor to perform the out-of-order execution before and after the fork instruction, thereby reducing an overhead involved in the thread generation. Therefore, a processing speed by the thread level parallel processing can be increased for the fine thread.

While the invention has been described in terms of several preferred embodiments, those skilled in the art will recognize that the invention can be practiced with modification within the spirit and scope of the appended claims.

What is claimed is:

1. A multi-processor system comprising a plurality of processors, each of said plurality of processors including a register, wherein
when a thread generation request is issued from a first processor to a second processor among said plurality of processors, a content of a first register of said first processor is inherited to a second register of said second processor, and
wherein when the content of said first register of said first processor is inherited to said second register of said second processor, a register selection bit indicating which one of said first and second registers should be referred is inherited from said first processor to said second processor, and a value of said first register of said first processor is inherited to said second register of said second processor for updating said second processor.

2. A multi-processor system having a plurality of processors, each of said plurality of processors executing a thread, each of said plurality of processors comprising:

an execution unit;
a reorder buffer for temporally keeping execution results by said execution unit;
a register for storing the execution results kept in said reorder buffer in-order; and
an instruction queue for waiting data necessary for an instruction to be executed by said execution unit and issuing said instruction to said execution unit, said instruction being given with the necessary data, and wherein said multi-processor system comprises means for transferring only data generated according to an instruction prior to a thread generation instruction from a first processor to a second processor among said plurality of processors, after said thread generation instruction is issued from said first processor to said second processor.

3. The multi-processor system according to claim 2, wherein said instruction queue and said execution unit are shared between each of said plurality of processors.

4. The multi-processor system according to claim 2, wherein the reorder buffer of said first processor transfers data stored therein to a register of said second processor.

5. The multi-processor system according to claim 2, said transfer means including:
a multiplexer for narrowing a width of the data from said first processor; and
a divider for supplying the data to said second processor after widening the width of said data.

6. The multi-processor system according to claim 2, further comprising:
a saving register which temporally stores data generated according to the instruction prior to said thread generation instruction when no processor which should issue said thread generation instruction exists in said plurality of processors, wherein after said thread generation instruction is issued to any one of said plurality of processors, said transfer means transfers data stored in said saving register to the processor to which said thread generation instruction is issued.

7. The multi-processor system according to claim 6, wherein one thread executed in said plurality of processors generates at least one thread.

8. A multi-processor system having a plurality of processors, each of said plurality of processors executing a thread, and a physical register shared by said plurality of processors,
each of said plurality of processors comprising:
an execution unit for generating execution results to be stored in said physical register;
a register mapping table for converting a logical register number of a logical register to a physical register number of said physical register, said logical register being software accessible; and
an instruction queue for waiting for necessary data for an instruction to be executed by said execution unit and issuing said instruction to said execution unit, said instruction being given with the necessary data, and
said multi-processor system comprising:
a thread manager for inheriting only data generated according to an instruction prior to a thread generation instruction from a first processor to a second processor among said plurality of processors, after said thread generation instruction is issued from said first processor to said second processor.

9. The multi-processor system according to claim 8, further comprising:

a register busy table which stores information as to a possibility of reading out from said physical register.

10. The multi-processor system according to claim 9, further comprising:

a register free table which stores a state of use of said physical register.

11. The multi-processor system according to claim 10, wherein said register free table stores whether said physical register is busy or not.

12. The multi-processor system according to claim 10, wherein said means for inheriting the data from said first processor to said second processor includes:

a multiplexer for narrowing a width of the data from said first processor; and a divider for supplying the data to said second processor after widening the width of said data.

13. The multi-processor system according to claim 10, further comprising:

a saving register which temporally stores data generated according to the instruction prior to said thread generation instruction when no processor which should issue said thread generation instruction exists in said plurality of processors, wherein after said thread generation instruction is issued to any of said plurality of processors, said transfer means transfers data stored in said saving register to the processor to which said thread generation instruction is issued.

14. The multi-processor system according to claim 13, wherein one thread executed in said plurality of processors generates at least one thread.

* * * * *